United States Patent
Beech, Jr. et al.

(10) Patent No.: US 10,518,234 B2
(45) Date of Patent: Dec. 31, 2019

(54) HYDROCARBON UPGRADING

(71) Applicant: ExxonMobil Chemical Patents Inc., Baytown, TX (US)

(72) Inventors: James H. Beech, Jr., Kingwood, TX (US); Reyyan Koc-Karabocek, Houston, TX (US); Christopher M. Evans, Jersey City, NJ (US); Jeffrey C. Yeh, Houston, TX (US); Teng Xu, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/017,365

(22) Filed: Jun. 25, 2018

(65) Prior Publication Data
US 2018/0305625 A1   Oct. 25, 2018

Related U.S. Application Data

(62) Division of application No. 14/713,611, filed on May 15, 2015, now Pat. No. 10,035,961.

(60) Provisional application No. 62/011,965, filed on Jun. 13, 2014.

(30) Foreign Application Priority Data

Aug. 18, 2014 (EP) .................................... 14181262

(51) Int. Cl.
*B01J 8/00* (2006.01)
*C10G 67/02* (2006.01)
*C10G 31/09* (2006.01)
*C10G 47/36* (2006.01)
*C10G 31/10* (2006.01)
*C10G 67/04* (2006.01)

(52) U.S. Cl.
CPC ............... *B01J 8/005* (2013.01); *B01J 8/006* (2013.01); *B01J 8/007* (2013.01); *C10G 31/09* (2013.01); *C10G 31/10* (2013.01); *C10G 47/36* (2013.01); *C10G 67/02* (2013.01); *C10G 67/04* (2013.01); *B01J 2208/00946* (2013.01)

(58) Field of Classification Search
CPC ................................. B01J 8/005; B01J 8/006
See application file for complete search history.

(56) References Cited

U.S. PATENT DOCUMENTS

| | | | |
|---|---|---|---|
| 2,382,260 | A | 8/1945 | Schaad |
| 3,278,415 | A | 10/1966 | Doberenz et al. |
| 4,572,781 | A | 2/1986 | Krasuk et al. |
| 4,732,664 | A | 3/1988 | Martini et al. |
| 4,741,840 | A | 5/1988 | Atherton et al. |
| 5,158,668 | A | 10/1992 | Chahar et al. |

(Continued)

FOREIGN PATENT DOCUMENTS

| | | |
|---|---|---|
| DE | 550157 C | 5/1932 |
| EP | 0274604 A | 7/1988 |

(Continued)

*Primary Examiner* — Renee Robinson

(57) ABSTRACT

Aspects of the invention provide a process for upgrading a hydrocarbon feed. The process includes providing a hydrocarbon feed and a utility fluid. Then selectively extracting from the feed at least a portion of particulates to produce a raffinate and an extract. Third hydroprocessing at least a portion of the raffinate.

20 Claims, 5 Drawing Sheets

(56) References Cited

U.S. PATENT DOCUMENTS

| | | | |
|---|---|---|---|
| 5,543,041 A * | 8/1996 | Okazaki | C10G 32/02 |
| | | | 196/46.1 |
| 5,871,634 A | 2/1999 | Wiehe et al. | |
| 6,579,443 B1 | 6/2003 | Iaccino et al. | |
| 9,777,227 B2 | 10/2017 | Soultanidis et al. | |
| 9,809,756 B2 | 11/2017 | Soultanidis et al. | |
| 2006/0070912 A1 | 4/2006 | Khan | |
| 2006/0231462 A1 * | 10/2006 | Johnson | C10G 9/00 |
| | | | 208/125 |
| 2007/0215521 A1 | 9/2007 | Havlik et al. | |
| 2008/0099371 A1 | 5/2008 | McCoy | |
| 2008/0156700 A1 | 7/2008 | Abulnaga et al. | |
| 2009/0272671 A1 | 11/2009 | Keusenkothen | |
| 2011/0083997 A1 | 4/2011 | Silva et al. | |
| 2013/0081978 A1 | 4/2013 | Brown et al. | |
| 2014/0238898 A1 | 8/2014 | Gillis | |

FOREIGN PATENT DOCUMENTS

| | | | | |
|---|---|---|---|---|
| EP | 308 195 | * | 3/1989 | C10B 55/00 |
| EP | 308195 A | | 3/1989 | |
| EP | 0626440 A | | 11/1994 | |
| EP | 2336268 A | | 6/2011 | |
| EP | 2692834 A | | 2/2014 | |
| WO | 2005/002701 A | | 1/2005 | |
| WO | 2007/106775 A | | 9/2007 | |
| WO | 2013/033580 A | | 3/2013 | |
| WO | 2013/033590 A | | 3/2013 | |

* cited by examiner

HYDROCARBON UPGRADING

CROSS-REFERENCE TO RELATED APPLICATIONS

This application is a divisional application of U.S. application Ser. No. 14/713,611 filed May 15, 2015, now allowed, which claims priority to and the benefit of U.S. Provisional Application Ser. No. 62/011,965, filed Jun. 13, 2014 and EP 14181262.8 filed Aug. 18, 2014, the entireties are incorporated herein by reference. The present application relates to U.S. Provisional Application No. 62/011,959 filed Jun. 13, 2014 which is incorporated by reference in its entirety.

FIELD OF INVENTION

The invention relates to upgrading hydrocarbons for improved blending characteristics, to processes for producing such upgraded hydrocarbons, to hydrocarbons produced by such processes, and to the use of such hydrocarbon products for blending with other hydrocarbons. Particularly, the process relates to improving hydrocarbon compatibility by removing from the hydrocarbon particulate matter in a specified size range to provide the upgraded hydrocarbon, and optionally hydroprocessing the upgraded hydrocarbon.

BACKGROUND OF INVENTION

Steam cracking, also referred to as pyrolysis, has long been used to crack hydrocarbon feedstocks into a wide range of relatively high value molecules including ethylene, propene, butenes, steam cracked gas oil ("SCGO"), etc. Besides these useful products, hydrocarbon pyrolysis can also produce a significant amount of relatively low-value heavy products, such as pyrolysis tar. When the pyrolysis is produced by steam cracking, the pyrolysis tar is identified as steam-cracker tar ("SCT"). Economic viability of refining processes relies in part on the ability to incorporate as much of the product and residual fractions, such as SCT into the value chain. One use of residual and/or relatively low value products is to blend these fractions with other hydrocarbons, e.g., with other feedstreams or products.

It is conventional to subject the SCT to hydroprocessing in the presence of a utility fluid, e.g., a solvent having significant aromatics content. The hydroprocessed SCT product generally has a decreased viscosity, decreased atmospheric boiling point range, and increased hydrogen content over that of the SCT feed, resulting in improved compatibility with fuel oil blend-stocks. Additionally, hydroprocessing the SCT in the presence of utility fluid produces fewer undesirable byproducts and the rate of increase in reactor pressure drop is lessened. Conventional processes for SCT hydroprocessing is disclosed in U.S. Pat. Nos. 2,382,260 and 5,158,668; and in International Patent Application Publication No. WO 2013/033590, which involves recycling a portion of the hydroprocessed tar for use as the utility fluid.

SCT, however, generally contains an undesirable amount of particulate matter, e.g., coke particles. The particulate matter represents about 0.5 wt. % of the SCT and ranges in size from 1 to about 1000 µm. Depending on the size of a commercial-scale SCT processor, this can represent approximately 5-10 tons of solids per day being sent through the hydroprocessing unit. The presence of these particulates generally leads to a rapid increase in reactor pressure drop and catalyst deactivation, resulting from the formation of undesirable foulant deposits on the catalyst, reactor internals, and ancillary equipment. As the amount of these deposits increases, the yield of the desired upgraded pyrolysis tar (upgraded SCT) decreases and the yield of undesirable byproducts increases. Moreover, the hydroprocessing reactor's pressure drop rapidly increases to a point where the reactor is inoperable.

Removing particulate matter, especially particulate matter that may be a foulant or foulant precursor, is not trivial. Conventional filtration techniques have difficulty handling the load of solids and require frequent removal of the retentate to remain operable, resulting, it is believed, from relatively small particles in the SCT which very effectively clog the filter mechanism. Removing particulates from SCT by conventional sedimentation, where particles in the SCT segregate to the bottom of a large pool, requires commercially-impractical residence times.

Thus, a method for reducing the impact of particulate matter in SCT and/or rendering the SCT more amenable to hydroprocessing would be beneficial.

SUMMARY OF INVENTION

While small particles present significant problems in filtration and sedimentation, it has been surprisingly found that the presence of particles in the hydroprocessor feed having a size of up to about 25 µm generally does not lead to the formation of deposits during SCT hydroprocessing. Thus, aspects of the invention relate to methods that selectively remove particulate matter having a size of ≥about 25 µm while allowing smaller particles to remain in the hydroprocessor feed.

Thus, in one aspect aspects of the invention provides a process for upgrading a hydrocarbon feed, comprising providing a fluid-feed mixture comprising a hydrocarbon feed and a utility fluid, the fluid-feed mixture having first and second particulates, the first particulates having a size ≥25 µm and being present in the fluid-feed mixture in an amount $A_f^{large}$, and the second particulates having a size in the range of 1.0 to 20.0 µm and being present in the fluid-feed mixture in an amount $A_f^{small}$. The process further includes selectively extracting from the fluid-feed mixture at least a portion of the first particulates to produce a raffinate and an extract, the extract comprising at least a portion of the extracted first particulates. The process further includes hydroprocessing at least a portion of the raffinate. The raffinate typically contains ≥50% (by weight) of the fluid-feed mixture's second particulates. The extract typically contains ≥50% (by weight) of the fluid-feed mixture's first particulates.

In another aspect, the invention relates to a process for upgrading a hydrocarbon feed. The process includes providing a fluid-feed mixture comprising a hydrocarbon feed and a utility fluid, and passing the fluid-feed mixture through a backwashing filtration system to produce (i) an extract, e.g., a solids-enriched portion, and (ii) a raffinate, e.g., a solids-depleted portion.

In yet another aspect, the invention relates to an apparatus for upgrading a hydrocarbon feed. The apparatus includes a fluid-feed supply for supplying a fluid-feed mixture. The fluid-feed mixture comprises a hydrocarbon feed and a utility fluid, the fluid-feed mixture having an amount $A_f^{small}$ (in weight percent, based on the weight of the fluid-feed mixture) of particulates having a size in the range of 1.0 to 20.0 µm. The apparatus also includes a separations system, the separations system being configured to selectively remove from the fluid-feed mixture ≥50 wt. %, e.g., ≥75 wt. %, ≥80 wt. %, ≥90 wt. %, ≥95 wt. %, ≥97.5 wt. %, ≥99 wt. % of particulates having a size ≥25.0 µm to produce an extract and a raffinate. The raffinate has an amount $A_r^{small}$ (in weight percent, based on the weight of the raffinate) of all particulates in the raffinate having a size in the range of 1.0 to 20.0 μm.

DETAILED DESCRIPTION

Definitions

Figure 1:
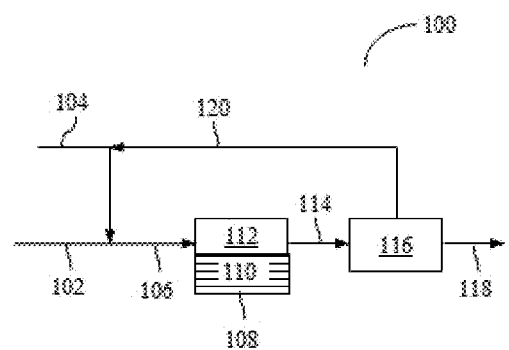
FIG. 1 illustrates a method according to an aspect of the invention.

"Hydrocarbon feed" refers to a flowable composition, e.g., liquid phase, high viscosity, and/or slurry composition, which (i) includes carbon bound to hydrogen and (ii) has a mass density greater than that of gasoline. Such compositions can include one or more of crude oil, crude oil fraction, and compositions derived therefrom which (i) have a kinematic viscosity ≤1.5×10$^3$ cSt at 50° C., (ii) contain carbon bound to hydrogen, and (iii) have a mass density ≥740 kg/m$^3$. Hydrocarbon feeds typically have a final boiling point at atmospheric pressure ("atmospheric boiling point") ≥430° F. (220° C.). Certain hydrocarbon feeds include components having an atmospheric boiling point ≥290° C., e.g., hydrocarbon feeds comprising ≥20% (by weight) of components having an atmospheric boiling point ≥290° C., e.g., ≥50%, such as ≥75%, or ≥90%. Certain hydrocarbon feeds appear to have the color black or dark brown when illuminated by sunlight, including those having a luminance ≤7 cd/m$^2$, luminance being measured in accordance with CIECAM02, established by the Commission Internationale de l'éclairage. Non-limiting examples of such feeds include pyrolysis tar, SCT, vacuum resid, atmospheric resid, vacuum gas oil ("VGO"), atmospheric gas oil ("AGO"), heavy atmospheric gas oil ("HAGO"), steam cracked gas oil ("SCGO"), deasphalted oil ("DAO"), cat cycle oil ("CCO"), including light cat cycle oil, ("LCCO"), and heavy cat cycle oil, "HCCO"), natural and synthetic feeds derived from tar sands, shale oil, coal etc.

"SCT" means (a) a mixture of hydrocarbons having one or more aromatic components and optionally (b) non-aromatic and/or non-hydrocarbon molecules, the mixture being derived from hydrocarbon pyrolysis and having a 90% Total Boiling Point ≥about 550° F. (290° C.) (e.g., ≥90.0 wt. % of the SCT molecules have an atmospheric boiling point ≥550° F. (290° C.)). SCT can comprise ≥50.0 wt. % (e.g., ≥75.0 wt. %, such as ≥90.0 wt. %), based on the weight of the SCT, of hydrocarbon molecules (including mixtures and aggregates thereof) having (i) one or more aromatic components and (ii) a number of carbon atoms ≥15. SCT generally has a metals content, ≤1.0×10$^3$ ppmw, based on the weight of the SCT (e.g., an amount of metals that is far less than that found in crude oil (or crude oil components) of the same average viscosity).

"Tar Heavies" ("TH") means a product of hydrocarbon pyrolysis, the TH having an atmospheric boiling point ≥565° C. and comprising ≥5.0 wt. % of molecules having a plurality of aromatic cores based on the weight of the product. The TH are typically solid at 25.0° C. and generally include the fraction of SCT that is not soluble in a 5:1 (vol.:vol.) ratio of n-pentane:SCT at 25.0° C. TH generally includes asphaltenes and other high molecular weight molecules.

"Solubility blending number (S)" and "insolubility number (I)" are described in U.S. Pat. No. 5,871,634, incorporated herein by reference in its entirety, and determined using n-heptane as the so-called "nonpolar, nonsolvent" and chlorobenzene as the solvent ratio of oil to test liquid mixture is in the range of from 1.0 to 5.0. Various such values are referred to herein. For example, "$I_{feed}$" refers to the insolubility number of the hydrocarbon feed; "$I_{product}$" refers to the insolubility number of the hydroprocessed product; "$S_{FO}$" refers to the solubility blending number of the fuel oil blend-stock; and "$S_{fluid}$" refers to the solubility blending number of the fluid or the fluid-enriched stream, as appropriate.

The term "portion" generally refers to one or more components derived from the fluid-feed mixture. Except for its use with respect to parts-per-million, the term "part" is used with respect to a designated process stream, generally indicating that less than the entire designated stream may be selected.

As used herein the term "size" means either the diameter of approximately spherical particulates or, where a particulate has another shape, the longest dimension thereof. Particulate dimensions and size can be determined by any suitable means, typically microscopically, using a representative number of particles. "Size" may refer to individual particulates, aggregates of particulates, or agglomerations of particulate-like matters (i.e., particulates that include therein a liquid-phase component or display liquid-like behavior.

The terms "$A_e^{large}$", "$A_f^{large}$" and "$A_r^{large}$" refer to the amount of particles having a size ≥25.0 μm in the extract, feed and raffinate, respectively, on a weight basis.

The terms "$A_e^{small}$", "$A_f^{small}$" and "$A_r^{small}$", refer to the amount of particles having a size of 1.0 to 20 μm in the extract, feed, and raffinate, respectively, on a weight basis.

The extract typically comprises solid particles having a size in the range of from 25.0 to 100.0 μm. The raffinate typically comprises solid particles having a size of ≤20.0 μm. The fluid-feed mixture has an amount, $A_f^{small}$, equal to the amount (in weight percent, based on the weight of the fluid-feed mixture) of all solid particles in the fluid-feed mixture having a size in the range of 1.0 to 20.0 μm. The raffinate has an amount, $A_r^{small}$, equal to the amount (in weight percent, based on the weight of the raffinate) of all solid particles in the raffinate having a size having a size in the range of 1.0 to 20.0 μm. $A_r^{small}$ is typically is ≥2.0* $A_f^{small}$.

Hydrocarbon Processing

The invention is based in part on the discovery that the presence of particulates having a size of up to about 25 μm do not generally lead to an increase in hydroprocessing reactor pressure drop when hydroprocessing of the hydrocarbon feed. Thus, time and expense related to removing such particles from the hydrocarbon feed, and a significant yield loss, may all be avoided without unacceptable loss in hydroprocessing performance.

The Hydrocarbon Feed

The hydrocarbon feed may comprise one or more hydrocarbon feeds described above, particularly SCT, resid or combinations thereof. Generally, the hydrocarbon feed has an initial insolubility number, $I_{feed} \geq$ about 20.0, e.g., ≥about 30.0, ≥about 40.0, ≥about 50.0, ≥about 60.0, ≥about 70.0, ≥about 80.0, ≥about 90.0, ≥about 100.0, ≥about 110.0, ≥about 120.0, ≥about 130.0, ≥about 140.0, or ≥about 150.0. Additionally or alternatively, the initial insolubility number of the feed may be ≤about 150.0, e.g., ≤about 140.0, ≤about 130.0, ≤about 120.0, ≤about 110.0, ≤about 100.0, ≤about 90.0, ≤about 80.0, ≤about 70.0, ≤about 60.0, ≤about 50.0, ≤about 40.0, or ≤about 30.0. Ranges expressly disclosed include combinations of any of the above-enumerated values, e.g., about 20.0 to about 150.0, about 30.0 to about 150.0, about 40.0 to about 150.0, about 50.0 to about 150.0, about 60.0 to about 150.0, about 70.0 to about 150.0, about 80.0 to about 150.0, about 90.0 to about 150.0, about 100.0 to about 150.0, about 110.0 to about 150.0, about 120.0 to about 150.0, about 130.0 to about 150.0, about 140.0 to about 150.0, etc. Particular hydrocarbon feeds, e.g., SCT's, that may benefit from any aspects of the invention can have an initial insolubility number, $I_{feed}$, of about 90.0 to about 150.0, about 100.0 to about 150.0, about 110.0 to about 150.0, about 120.0 to about 150.0, or about 130.0 to about 150.0. For other hydrocarbon feeds, e.g., resid, the $I_{feed}$ may be about 20 to about 90.0, about 30.0 to about 80.0, about 40.0 to about 70.0.

In certain aspects it is desirable to utilize as a feed an SCT having little or no olefin content, particularly in aspects where one or more components of the fluid-feed mixture, e.g., the raffinate or a part thereof, is subjected to hydroprocessing after separation. It is observed that the rate of reactor pressure-drop increase across the hydroprocessing reactor is lessened when utilizing an SCT having a lesser olefin content, e.g., a lesser content of vinyl aromatics. For example, in certain aspects the amount of olefin the SCT is ≤10.0 wt. %, e.g., ≤5.0 wt. %, such as ≤2.0 wt. %, based on the weight of the SCT. More particularly, the amount of (i) vinyl aromatics in the SCT and/or (ii) aggregates in the SCT which incorporate vinyl aromatics is generally ≤5.0 wt. %, e.g., ≤3 wt. %, such as ≤2.0 wt. %, based on the weight of the SCT.

The invention is compatible with hydrocarbon feed feeds having a relatively high sulfur content, e.g., ≥0.1 wt. %, based on the weight of the SCT, such as ≥1.0, or ≥2.0 wt. %, or in the range of 0.5 wt. % to 7.0 wt. %. High sulfur content is not required, and relatively low sulfur-content SCT can be used, e.g., SCT having a sulfur content ≤0.1 wt. %, based on the weight of the SCT, e.g., ≤0.05 wt. %, such as ≤0.01 wt. %. Hydrocarbon feeds having (i) a lesser olefin content and/or (ii) a higher sulfur content, and methods for producing such feeds, are disclosed in U.S. Patent Application No. 62/005,679, which is incorporated by reference herein in its entirety.

The Fluid-Feed Mixture

The hydrocarbon feed is combined by any suitable method with a fluid to form a fluid-feed mixture. The fluid-feed mixture generally comprises ≥about 5.0 wt. % of the hydrocarbon feed, e.g., ≥about 10.0 wt. %, ≥about 20.0 wt. %, ≥about 30.0 wt. %, ≥about 40.0 wt. %, ≥about 50.0 wt. %, ≥about 60.0 wt. %, ≥about 70.0 wt. %, ≥about 80.0 wt. %, ≥about 90.0 wt. % hydrocarbon feed, based on the total weight of the fluid-feed mixture. Additionally or alternatively, the fluid-feed mixture may include ≤about 10.0 wt. % hydrocarbon feed, e.g., ≤about 20.0 wt. %, ≤about 30.0 wt. %, ≤about 40.0 wt. %, ≤about 50.0 wt. %, ≤about 60.0 wt. %, ≤about 70.0 wt. %, ≤about 80.0 wt. %, ≤about 90.0 wt. %, or ≤about 95.0 wt. % hydrocarbon feed, based on the total weight of the fluid feed mixture. Ranges expressly disclosed include combinations of any of the above-enumerated values, e.g., about 5.0 to about 95.0 wt. %, about 5.0 to about 90.0 wt. %, about 5.0 to about 80 wt. %, about 5.0 to about 70.0 wt. %, about 5.0 to about 60.0 wt. %, about 5.0 to about 50.0 wt. %, about 5.0 to about 40.0 wt. %, about 5.0 to about 30.0, about 5.0 to about 20.0, about 5.0 to about 10.0 wt. % hydrocarbon feed, etc.

In addition to the hydrocarbon feed, the fluid-feed mixture generally comprises ≥about 5.0 wt. % fluid, e.g., ≥about 10.0 wt. %, ≥about 20.0 wt. %, ≥about 30.0 wt. %, ≥about 40.0 wt. %, ≥about 50.0 wt. %, ≥about 60.0 wt. %, ≥about 70.0 wt. %, ≥about 80.0 wt. %, or ≥about 90.0 wt. %, based on the total weight of the fluid-feed mixture. Additionally or alternatively, the fluid-feed mixture may include ≤about 10 wt. % fluid, e.g., ≤about 20 wt. %, ≤about 30 wt. %, ≤about 40 wt. %, ≤about 50 wt. %, ≤about 60 wt. %, ≤about 70 wt. %, ≤about 80 wt. %, ≤about 90 wt. %, or ≤about 95.0 wt. % fluid, based on the total weight of the fluid feed mixture. Ranges expressly disclosed include combinations of any of the above-enumerated values, e.g., about 5.0 to about 95.0 wt. %, about 5.0 to about 90.0 wt. %, about 5.0 to about 80 wt. %, about 5.0 to about 70.0 wt. %, about 5.0 to about 60.0 wt. %, about 5.0 to about 50.0 wt. %, about 5.0 to about 40.0 wt. %, about 5.0 to about 30.0, about 5.0 to about 20.0, about 5.0 to about 10.0 wt. % fluid, etc.

Generally, but not necessarily, the kinetic viscosity of the fluid-feed mixture is less than that of the hydrocarbon feed. In particular aspects, the kinetic viscosity of the fluid-feed mixture may be ≥about 0.5 cPoise, e.g., ≥about 1.0 cPoise, ≥about 2.5 cPoise, ≥about 5.0 cPoise, or ≥about 7.5 cPoise. Additionally or alternatively, the kinetic viscosity of the fluid-feed mixture may be ≤about 10.0 cPoise, e.g., ≤about 7.5 cPoise, ≤about 5.0 cPoise, ≤about 2.5 cPoise, ≤about 1.0 cPoise, or ≤about 0.75 cPoise. Ranges expressly disclosed include combinations of any of the above-enumerated values, e.g., about 0.5 to about 10.0 cPoise, about 1.0 to about 10.0 cPoise, about 2.5 to about 10.0 cPoise, about 5.0 to about 10.0 cPoise, about 7.5 to about 10.0 cPoise, etc.

The Utility Fluid

The utility fluid may be any fluid comprising ≥40.0 wt. %, ≥45.0 wt. %, ≥50.0 wt. %, ≥55.0 wt. %, or ≥60.0 wt. %, based on the weight of the utility fluid, of at least one aromatic or non-aromatic ring-containing compound. Particular utility fluids comprise ≥40.0 wt. %, ≥45.0 wt. %, ≥50.0 wt. %, ≥55.0 wt. %, or ≥60.0 wt. % of at least one multi-ring compound, based on the weight of the utility fluid and the total weight of the multi-ring compounds therein. The compounds comprise a majority of carbon and hydrogen atoms but can also contain a variety of substituents and/or heteroatoms.

In certain aspects, the utility fluid comprises aromatics, e.g., ≥70.0 wt. % aromatics, based on the weight of the utility fluid, such as ≥80.0 wt. %, or ≥90.0 wt. %. Typically, the utility fluid comprises ≤10.0 wt. % of paraffin, based on the weight of the utility fluid. For example, the utility fluid can comprise ≥95.0 wt. % of aromatics, ≤5.0 wt. % of paraffin. Optionally, the utility fluid has a final boiling point ≤750° C. (1400° F.), e.g., ≤570° C. (1050° F.), such as ≤430° C. (806° F.). Such utility fluids can comprise ≥25.0 wt. % of 1-ring and 2-ring aromatics (i.e., those aromatics having one or two rings and at least one aromatic core), based on the weight of the utility fluid. Utility fluids having a relatively low final boiling point can be used, e.g., a utility fluid having a final boiling point ≤400° C. (750° F.). The utility fluid can have an 10% (weight basis) total boiling point ≥120° C., e.g., ≥140° C., such as ≥150° C. Optionally, 90 wt. % of the utility fluid has an atmospheric boiling point total boiling point ≤430° C., e.g., ≤400° C. Suitable utility fluids include those having a true boiling point distribution in the range of from about 175° C. (350° F.) to about 400° C. (750° F.). A true boiling point distribution can be determined, e.g., by conventional methods such as the method of ASTM D7500, which can be extended by extrapolation when the true boiling point distribution has a final boiling point that is greater than that specified in the standard.

The utility fluid typically comprises aromatics, e.g., ≥95.0 wt. % aromatics, such as ≥99.0 wt. %. For example, the utility fluid comprises ≥95.0 wt. % based on the weight of the utility fluid of one or more of benzene, ethylbenzene, trimethylbenzene, xylenes, toluene, naphthalenes, alkylnaphthalenes (e.g., methylnaphthalenes), tetralins, or alkyltetralins (e.g., methyltetralins), e.g., ≥99.0 wt. %, such as ≥99.9 wt. %. It is generally desirable for the utility fluid to be substantially free of molecules having alkenyl functionality, particularly in aspects utilizing a hydroprocessing catalyst having a tendency for coke formation in the presence of such molecules. In certain aspects, the supplemental utility fluid comprises ≤10.0 wt. % of ring compounds having $C_1$-$C_6$ sidechains with alkenyl functionality, based on the weight of the utility fluid.

Certain solvents and solvent mixtures can be used as utility fluid, including steam cracked naphtha ("SCN"), SCGO, and/or other solvent comprising aromatics, such as those solvents comprising ≥90.0 wt. %, e.g., ≥95.0 wt. %, such as ≥99.0 wt. % of aromatics, based on the weight of the solvent. Representative aromatic solvents that are suitable for use as utility fluid include A200 solvent, available from ExxonMobil Chemical Company (Houston Tex.), CAS number 64742-94-5. In one or more aspects, the utility fluid (i) has a critical temperature in the range of 285° C. to 400° C., and (ii) comprises aromatics, including alkyl-functionalized derivatives thereof. For example, the specified utility fluid can comprise ≥90.0 wt. % of a single-ring aromatic, including those having one or more hydrocarbon substituents, such as from 1 to 3 or 1 to 2 hydrocarbon substituents. Such substituents can be any hydrocarbon group that is consistent with the overall solvent distillation characteristics. Examples of such hydrocarbon groups include, but are not limited to, those selected from the group consisting of $C_1$-$C_6$ alkyl, wherein the hydrocarbon groups can be branched or linear and the hydrocarbon groups can be the same or different. Optionally, the specified utility fluid comprises ≥90.0 wt. % based on the weight of the utility fluid of one or more of benzene, ethylbenzene, trimethylbenzene, xylenes, toluene, naphthalenes, alkylnaphthalenes (e.g., methylnaphthalenes), tetralins, or alkyltetralins (e.g., methyltetralins).

Although not critical, typically the utility fluid is substantially free of molecules having terminal unsaturates, for example, vinyl aromatics, particularly in aspects utilizing a hydroprocessing catalyst having a tendency for coke formation in the presence of such molecules. The term "substantially free" in this context means that the utility fluid comprises ≤10.0 wt. % (e.g., ≤5.0 wt. % or ≤1.0 wt. %) vinyl aromatics, based on the weight of the utility fluid.

Where hydroprocessing is envisioned, the utility fluid contains a sufficient amount of molecules having one or more aromatic cores to effectively increase run length of the tar hydroprocessing process. For example, the utility fluid can comprise ≥50.0 wt. % of molecules having at least one aromatic core (e.g., ≥60.0 wt. %, such as ≥70 wt. %) based on the total weight of the utility fluid. In an aspect, the utility fluid comprises (i) ≥60.0 wt. % of molecule having at least one aromatic core and (ii) ≤1.0 wt. % of vinyl aromatics, the weight percents being based on the weight of the utility fluid.

The utility fluid can be one having a high solvency, as measured by solubility blending number ("$S_{Fluid}$"). For example, the utility fluid can have a $S_{Fluid}$≥90.0, e.g., ≥about 100.0, ≥about 110.0, ≥about 120.0, ≥about 150.0, ≥about 175.0, or ≥about 200.0. Additionally or alternatively, $S_{Fluid}$ can be ≤about 200.0, e.g., ≤about 175.0, ≤about 150.0, ≤about 125.0, ≤about 110.0, or ≤about 100.0. Ranges expressly disclosed include combinations of any of the above-enumerated values; e.g., 90.0 to about 200.0, about 100.0 to about 200.0, about 110.0 to about 200.0, about 120.0 to about 200.0, about 150.0 to about 200.0, about 175.0 to about 200.0, etc. Exemplary fluids include A200, A150, and A100, available from Exxon Mobil Chemical Company. Other exemplary fluid includes methyl naphthalene, trimethyl benzene. Particular exemplary fluids are described in U.S. Patent Application No. 61/986,316, filed on Apr. 30, 2014, incorporated by reference herein in its entirety. Steam cracker gas oil, which typically has a solubility blend number of about 100, and Light Cycle Oil, typically having a solubility blending number of about 120, may also be used.

Additionally or alternatively, the utility fluid may be characterized by a kinetic viscosity of that is typically less than that of the fluid-feed mixture. In particular aspects, the kinetic viscosity of the fluid-feed mixture may be ≥about 0.1 cPoise, e.g., ≥about 0.5 cPoise, ≥about 1.0 cPoise, ≥about 2.5 cPoise, or ≥about 4.0 cPoise. Additionally or alternatively, the kinetic viscosity of the fluid-feed mixture may be ≤about 5.0 cPoise, e.g., ≤about 4.0 cPoise, ≤about 2.5 cPoise, ≤about 1.0 cPoise, ≤about 0.5 cPoise, or ≤about 0.25 cPoise. Ranges expressly disclosed include combinations of any of the above-enumerated values, e.g., about 0.1 to about 5.0 cPoise, about 0.5 to about 5.0 cPoise, about 1.0 to about 5.0 cPoise, about 2.5 to about 5.0 cPoise, about 4.0 to about 5.0 cPoise, etc. In some aspects, the kinematic viscosity is adjusted so that particles having a size larger than 25 μm settle out of the fluid-feed mixture to provide the extract and raffinates described herein, more particularly to adjust the viscosity to also enable the amount of solids removal and throughput of the raffinate from the process. It was expected that combining the hydrocarbon feed with utility fluid would, without enlarging the settling equipment, result in a decrease in the amount of hydrocarbon feed that could be conducted to the hydroprocessor. It is surprisingly observed that this difficulty is more than overcome by the decrease in viscosity of the fluid-feed mixture compared to that of the hydrocarbon feed. The decreased viscosity leads to much a faster settling time for particulates having a size ≥25 μm. The faster settling time is observed to more than compensate for the lesser amount of hydrocarbon feed in the settling equipment. In other words, the amount of hydrocarbon feed available for hydroprocessing is substantially the same, or even increased, over processes where no utility fluid is utilized.

Selectively Extracting Particulates Having a Size ≥25.0 μm

Particulates having a size ≥25.0 μm may be selectively extracted from the fluid-feed mixture in a separation stage by, e.g., one or more of sedimentation, filtration, extraction, centrifuging, use of a hydrocyclone etc. Conventional separations technology can be utilized, but the invention is not limited thereto.

In particular aspects, the separation stage comprises one or more filtration systems whose filter mechanisms are selected to, under operating conditions, substantially impede the flow of particles having a size ≥25.0 μm while allowing substantially unimpeded flow of fluids, gases, and particulates having a size <about 20.0 μm. Suitable filtration means include conventional filters, but the invention is not limited thereto. When conventional filtration technology is utilized, the extract is referred to as retentate, and the raffinate referred to as permeate. A filtration system capable of periodically removing the retentate (i.e., the extract) from the filter mechanism, (e.g., membrane, mesh, etc.) may be used. Such filtration systems should be selected such that the filter mechanism is designed to retain particulate matter having a size ≥25.0 μm in the extract.

The performance of the separation system may also be characterized by the weight percent of particles in the fluid-feed mixture that are removed. Additionally or alternatively, aspects of the invention provide an extract that has an amount, $A_e^{large}$, of particulates having a size in the range ≥25.0 μm, wherein $A_e^{large}$ is ≥2.0*$A_f^{large}$ on a weight basis. In particular aspects, $A_e^{large}$ is ≥3.0*$A_f^{large}$, $A_e^{large}$ is ≥4.0*$A_f^{large}$, $A_e^{large}$ is ≥5.0*$A_f^{large}$, $A_e^{large}$ is ≥10.0*$A_f^{large}$, $A_e^{large}$ is ≥20.0*$A_f^{large}$, $A_e^{large}$ is ≥50.0*$A_f^{large}$, e.g., the ratio of $A_e^{large}$:$A_f^{large}$ may be 2.0 to 50.0, 3.0 to 50.0, 4.0 to 50.0, 5.0 to 50.0, 10.0 to 50.0, 20.0 to 50.0, etc. The performance of the separation system may also be characterized by the weight percent of particles in the fluid-feed mixture that are retained in the extract. For example, the separation system may selectively remove ≥50.0 wt. %, e.g., ≥75.0 wt. %, ≥80.0 wt. %, ≥90.0 wt. %, ≥95.0 wt. %, ≥97.5 wt. %, or ≥99.0 wt. % of particles having a size ≥25.0 μm from the fluid-feed mixture to be retained in the extract. Additionally or alternatively, the separation system may retain ≤100.0 wt. %, ≤99.0 wt. %, ≤97.5 wt. %, ≤95.0 wt. %, ≤90.0 wt. %, ≤80.0 wt. %, or ≤75.0 wt. %, of particulates having a size ≥25.0 μm. Ranges expressly disclosed include combinations of any of the above-enumerated values; e.g., 50.0 to about 100.0, 75.0 to about 100.0, 80.0 to about 100.0, 90.0 to about 100.0, 95.0 to about 100.0, 97.5.0 to about 100.0, 99.0 to about 100.0, etc., of particulate matter having a size ≥25.0 μm. In particular aspects, the separation system is selected to remove the above recited amounts of particles having a size 25.0 to 100.0 μm, 25.0 to 75.0 μm, or 25.0 to 50.0 μm, wherein the amounts are based on the total weight of particulates having a size in the range of from 25.0 to 100.0 μm, 25.0 to 75.0 μm, 25.0 to 50.0 μm, respectively, in the fluid-feed mixture.

The separation system should also be selected to allow at least a portion of particulate matter smaller than 20.0 μm to pass through the filter mechanism and be retained in the raffinate (i.e., permeate.). In an aspect of the invention, selectively extracting particulates provides a raffinate having an amount, $A_r^{small}$, of particulates having a size in the range of 1.0 to 20.0 μm, wherein $A_r^{small}$ is ≥2.0*$A_f^{small}$ on a weight basis. In particular aspects, $A_r^{small}$ is ≥3.0*$A_f^{small}$, $A_r^{small}$ is ≥4.0*$A_f^{small}$, $A_r^{small}$ is ≥5.0*$A_f^{small}$, $A_r^{small}$ is ≥10.0*$A_f^{small}$, $A_r^{small}$ is ≥20.0*$A_f^{small}$, $A_r^{small}$ is ≥50.0*$A_f^{small}$, e.g., the ratio of $A_r^{small}$:$A_f^{small}$ may be 2.0 to 50.0, 3.0 to 50.0, 4.0 to 50.0, 5.0 to 50.0, 10.0 to 50.0, 20.0 to 50.0, etc. The performance of the separation system may also be characterized by the weight percent of particles in the fluid-feed mixture that is allowed to remain in the raffinate. For example, the separation system can be selected so that ≥50.0 wt. %, e.g., ≥60.0 wt. %, ≥70.0 wt. %, ≥80.0 wt. %, ≥90.0 wt. %, ≥95.0 wt. %, or ≥99.0 wt. %, of all particulates having a size in the range of from 1.0 to 20.0 μm remain in the raffinate after separation. Additionally or alternatively, the separation system may be selected so that ≤100 wt. %, e.g., ≤99.0 wt. %, ≤95.0 wt. %, ≤90.0 wt. %, ≤80.0 wt. %, ≤70.0 wt. %, or ≤60.0 wt. %, of all particulates having a size of 1 to 20.0 μm remain in the raffinate. Ranges expressly disclosed include combinations of any of the above-enumerated values, e.g., about 50.0 to about 100.0 wt. % of all particulates having a size in the range of 1.0 to 20.0 μm in the fluid-feed mixture (based on the total weight of the fluid feed mixture) pass through the filtration system and remain in the raffinate, e.g., 60.0 to about 100.0 wt. %, 70.0 to about 100.0 wt. %, 80.0 to about 100.0 wt. %, 90.0 to about 100.0 wt. %, 95.0 to about 100 wt. %, 99.0 to about 100.0 wt. %, etc.

Additionally or alternatively, the extract and raffinate may be obtained by removing the extract from the fluid-feed mixture in at least one sedimentation unit. Sedimentation units typically include a fluid-feed inlet for receiving the fluid-feed mixture, a sedimentation tank for holding the fluid-feed mixture for a desired sedimentation period (e.g., a period of time sufficient for the fluid-feed mixture to stratify), and means for removing the raffinate. Optionally, the sedimentation unit may include means for removing the extract and conducting the extract away, e.g., to prevent the accumulation of this byproduct. Stratification generally results in producing a first layer containing higher-density components of the fluid-feed mixture (e.g., extract), with lower density components (e.g., raffinate) being included in a second layer that is located above the first layer. Additionally or alternatively, particulate matter having a size ≥25.0 μm can be extracted from the fluid-feed mixture by applying a central force sufficient to cause the mixture to undergo substantially uniform circular motion. Depending on the rotational velocity and the duration over which the central force is applied, more dense particulates will separate from the fluid-feed mixture, e.g., by stratification. The central force can be applied using, e.g., one or more cyclones, such as one or more hydrocyclones; one or more centrifuges, etc. Those skilled in the art of hydrocarbon separations will appreciate that the above-described separations systems, e.g., filtration systems, centrifuges, sedimentation systems, etc., are conventional and can be readily adapted for use in the separations systems of the invention. It was expected that particulates in the fluid-feed mixture would be of about even density. It is surprisingly found that this is not the case—the larger size particles (those having a size ≥25.0 μm) are more dense than those having an average size ≤about 20 μm. This feature allows for efficient extraction, e.g., by sedimentation, of those particulates which have an especially undesirable effect on hydrocarbon feed blending characteristics (the particulates having a size ≥25.0 μm).

In particular aspects, the amount of raffinate that is conducted away from the separation system may be ≥about $7.0\times10^4$ kg/hour, e.g., ≥about $7.5\times10^4$ kg/hour, ≥about $8.0\times10^4$ kg/hour, ≥about $8.5\times10^4$ kg/hour, ≥about $9.0\times10^4$ kg/hour, or ≥about $9.5\times10^4$ kg/hour. Additionally or alternatively, the amount of the raffinate that is conducted away from the separation system may be ≤about $10.0\times10^4$ kg/hour, ≤about $9.5\times10^4$ kg/hour, ≤about $9.0\times10^4$ kg/hour, ≤about $8.5\times10^4$ kg/hour, ≤about $8.0\times10^4$ kg/hour, or ≤about $7.5\times10^4$ kg/hour. Ranges of the amount of raffinate conducted away from the separation system include combinations of any of the above-enumerated values, e.g., about $7.0 \times 10^4$ to about $10.0 \times 10^4$ kg/hour, about $7.5 \times 10^4$ to about $10.0 \times 10^4$ kg/hour, about $8.0 \times 10^4$ to about $10.0 \times 10^4$ kg/hour, about $8.5 \times 10^4$ to about $10.0 \times 10^4$ kg/hour, about $9.0 \times 10^4$ to about $10.0 \times 10^4$ kg/hour, about $9.5 \times 10^4$ to about $10.0 \times 10^4$ kg/hour, etc.

Additionally or alternatively, the amount of particulates removed by the separation system may be ≥about 150 kg/hour, e.g., ≥about 175 kg/hour, ≥about 200 kg/hour, ≥about 225 kg/hour, ≥about 250 kg/hour, ≥about 275 kg/hour, ≥about 300 kg/hour, ≥about 325 kg/hour, ≥about 350 kg/hour, or ≥about 375 kg/hour, or ≥about 400 kg/hour. Additionally or alternatively, the amount of particulates removed by the separation system may be ≤about 400 kg/hour, e.g., ≤about 375 kg/hour, ≤about 350 kg/hour, ≤about 325 kg/hour, ≤about 300 kg/hour, ≤about 275 kg/hour, ≤about 250 kg/hour, ≤about 225 kg/hour, ≤about 200 kg/hour, or ≤about 175 kg/hour. Ranges of the amount of particulates removed by the separation system that are expressly disclosed include combinations of any of the above-enumerated values; e.g., about 150 to about 400 kg/hour, about 175 to about 400 kg/hour, about 200 to about 400 kg/hour, about 225 to about 400 kg/hour, about 250 to about 400 kg/hour, about 275 to about 400 kg/hour, about 300 to about 400 kg/hour, about 325 to about 400 kg/hour, about 350 to about 400 kg/hour, about 375 to about 400 kg/hour, etc.

Typically, the extract includes both liquid and solid phases. These may be separated by providing the extract to a solids separation unit, e.g., centrifuge, sedimentation unit, or hydrocyclone, where the solid and liquid phases are separated. Typically, although not necessarily, the liquid portion from the solid separation unit is recycled to the process.

Hydroprocessing

At least a portion of the raffinate obtained from the separation stage may be provided to a hydroprocessing unit, effectively increasing run-length of the hydroprocessing unit. It has been observed that such raffinates, which include particulates having a size ≤20.0 μm, surprisingly do not unacceptably foul the hydroprocessing equipment and/or the hydroprocessing catalyst. Without wishing to be held to any particular theory, it may be that such particulates behave differently because they have a substantially different composition from larger particles or it may be that such particulates do not entrain tacky liquid portions that facilitate adhesion of the particulates to component or catalyst surfaces. Typically, at least a portion of fluid-feed mixture's fluid is conducted away from the separations stage as a component of the raffinate, and remains in the raffinate during the hydroprocessing. The relative amount of fluid in the raffinate during hydroprocessing may be in the range of from about 5.0 wt. % to about 80.0 wt. % of the fluid, based on total weight of the raffinate. For example, the relative amounts of fluid and hydrocarbon feed during hydroprocessing can be in the ranges described for the fluid-feed mixture, particularly about 10.0 wt. % to about 80.0 wt. % of the fluid, or about 10.0 wt. % to about 60.0 wt. % of the fluid.

Raffinate hydroprocessing can be carried out in one or more hydroprocessing stages, the stages comprising one or more hydroprocessing vessels or zones. Vessels and/or zones within the hydroprocessing stage in which catalytic hydroprocessing activity occurs generally include at least one hydroprocessing catalyst. The catalysts can be mixed or stacked, such as when the catalyst is in the form of one or more fixed beds in a vessel or hydroprocessing zone.

The hydroprocessing can be catalytic hydroprocessing, carried out in the presence of one or more hydroprocessing catalysts. Conventional hydroprocessing catalyst can be utilized, such as those specified for use in resid and/or heavy oil hydroprocessing, but the invention is not limited thereto. Suitable hydroprocessing catalysts include those comprising (i) one or more bulk metals and/or (ii) one or more metals on a support. The metals can be in elemental form or in the form of a compound. In one or more aspects, the hydroprocessing catalyst includes at least one metal from any of Groups 5 to 10 of the Periodic Table of the Elements (tabulated as the Periodic Chart of the Elements, The Merck Index, Merck & Co., Inc., 1996). Examples of such catalytic metals include, but are not limited to, vanadium, chromium, molybdenum, tungsten, manganese, technetium, rhenium, iron, cobalt, nickel, ruthenium, palladium, rhodium, osmium, iridium, platinum, or mixtures thereof. In one or more aspects, the catalyst is a bulk multimetallic hydroprocessing catalyst with or without binder. In an aspect the catalyst is a bulk trimetallic catalyst comprised of two Group 8 metals, preferably Ni and Co and the one Group 6 metals, preferably Mo. Conventional hydrotreating catalysts can be used, but the invention is not limited thereto. In certain aspects, the catalysts include one or more of KF860 available from Albemarle Catalysts Company LP, Houston Tex.; Nebula® Catalyst, such as Nebula® 20, available from the same source; Centera® catalyst, available from Criterion Catalysts and Technologies, Houston Tex., such as one or more of DC-2618, DN-2630, DC-2635, and DN-3636; Ascent® Catalyst, available from the same source, such as one or more of DC-2532, DC-2534, and DN-3531; and FCC pre-treat catalyst, such as DN3651 and/or DN3551, available from the same source. However, the invention is not limited to only these catalysts.

Hydroprocessing the raffinate instead of the fluid-feed mixture lengthens catalyst life under hydroprocessing conditions, e.g., allowing the hydroprocessing stage to operate for at least 3 months, or at least 6 months, or at least 1 year without the need for replacing, regenerating, and/or rejuvenating the catalyst. Catalyst life is generally ≥2 times longer for raffinate hydroprocessing than is this case for hydroprocessing the fluid-feed mixture, e.g., ≥5 times longer, such as ≥10 times longer. In any of the preceding aspects, the rate of increase in hydroprocessor pressure drop ("$R_2$") when hydroprocessing the raffinate is less than the rate of increase in hydroprocessor pressure drop ("$R_1$") when hydroprocessing the entire fluid-feed mixture, e.g., $R_2 \leq 0.9*R_1$, such as $R_2 \leq 0.5*R_1$, or $R_2 \leq 0.1*R_1$.

The amount of coking in the hydroprocessing or contacting zone is relatively small, and run lengths are relatively long as indicated by relatively a small increase in reactor pressure drop over its start-of-run ("SOR") value, as calculated by ([Observed pressure drop−Pressure drop$_{SOR}$]/Pressure drop$_{SOR}$)*100%. The increase in pressure drop may be ≤25.0%, ≤10.0%, ≤5.0%, ≤2.5%, or ≤1.0%. Additionally or alternatively, the hydroprocessing reactor the increase in pressure drop compared to the SOR value may be ≤70 psi (5 bar), ≤30 psi (2 bar), e.g., ≤25 psi (1.7 bar), ≤20 psi (1.3 bar), ≤15 psi, ≤10 psi (0.7 bar), or ≤5 psi (0.3 bar, ≥1.0 psi (0.07 bar), ≥5.0 psi (0.3 bar), ≥10.0 psi (0.7 bar), ≥15.0 psi (1.0 bar), ≥20.0 psi (1.3 bar), or ≥25.0 psi (1.7 bar). Ranges of the pressure drop expressly disclosed include all combinations of these values, e.g., 1.0 psi (0.07 bar) to 70.0 psi (5 bar), 1.0 psi (0.07 bar) to 30.0 psi (2 bar), 1.0 psi (0.07 bar) to 25.0 psi (1.7 bar), 1.0 psi (0.07 bar) to 20.0 psi (1.3 bar), 1.0 psi (0.07 bar) to 15.0 psi (1.0 bar), 1.0 psi (0.07 bar) to 10.0 psi (0.7 bar), 1.0 (0.07 bar) to 5.0 psi (0.3 bar), etc. The pressure drop may be determined between any two convenient times, $T_1$ and $T_2$. $T_1$ is typically the time associated with the SOR value. $T_2$ may be any arbitrary time thereafter. Thus, the observed pressure drop may be determined over a period, $T_2$-$T_1$, ≥about 30 days, ≥about 50 days, ≥about 75 days, ≥about 100 days, ≥about 125 days, ≥about 150 days, ≥about 175 days, ≥about 200 days, ≥about 250 days, ≥about 300 days, ≥about 350 days, ≥about 400 days, ≥about 450 days, ≥about 500 days, ≥about 550 days, ≥about 600 days, ≥about 650 days, or ≥about 700 days or more.

The hydroprocessing is carried out in the presence of hydrogen, e.g., by (i) combining molecular hydrogen with the tar stream and/or fluid upstream of the hydroprocessing and/or (ii) conducting molecular hydrogen to the hydroprocessing stage in one or more conduits or lines. Although relatively pure molecular hydrogen can be utilized for the hydroprocessing, it is generally desirable to utilize a "treat gas" which contains sufficient molecular hydrogen for the hydroprocessing and optionally other species (e.g., nitrogen and light hydrocarbons such as methane) which generally do not adversely interfere with or affect either the reactions or the products. Unused treat gas can be separated from the hydroprocessed product for re-use, generally after removing undesirable impurities, such as $H_2S$ and $NH_3$. The treat gas optionally contains ≥about 50 vol. % of molecular hydrogen, e.g., ≥about 75 vol. %, based on the total volume of treat gas conducted to the hydroprocessing stage.

Optionally, the amount of molecular hydrogen supplied to the hydroprocessing stage is in the range of from about 300 standard cubic feet of molecular hydrogen per barrel ("SCF/B"), where B refers to barrel of raffinate fed to the hydroprocessing stage, to 5000 SCF/B. This corresponds to 53 standard cubic meters of molecular hydrogen per cubic meter of raffinate (S $m^3/m^3$) to 890 S $m^3/m^3$. For example, the molecular hydrogen can be provided in a range of from 1000 SCF/B (178 S $m^3/m^3$) to 3000 SCF/B (534 S $m^3/m^3$). An example of suitable catalytic hydroprocessing conditions will now be described in more detail. The invention is not limited to these conditions, and this description is not meant to foreclose other hydroprocessing conditions within the broader scope of the invention.

The hydroprocessing is generally carried out under hydroconversion conditions, e.g., under conditions for carrying out one or more of hydrocracking (including selective hydrocracking), hydrogenation, hydrotreating, hydrodesulfurization, hydrodenitrogenation, hydrodemetallation, hydrodearomatization, hydroisomerization, or hydrodewaxing of the specified tar stream. The hydroprocessing reaction can be carried out in at least one vessel or zone that is located, e.g., within a hydroprocessing stage downstream of the pyrolysis stage and separation stage. The raffinate, including the fluid, generally contacts the hydroprocessing catalyst in the vessel or zone, in the presence of molecular hydrogen. Catalytic hydroprocessing conditions can include, e.g., exposing the feed to the hydroprocessing unit to temperature in the range from 50° C. to 500° C., or from 200° C. to 450° C., or from 220° C. to 430° C., or from 350° C. to 420° C., proximate to the molecular hydrogen and hydroprocessing catalyst. For example, a temperature in the range of from 300° C. to 500° C., or 350° C. to 430° C., or 360° C. to 420° C. can be utilized. Liquid hourly space velocity (LHSV) of the raffinate will generally range from 0.1 to 30 $h^{-1}$, or 0.4 to 25. $h^{-1}$, or 0.5 $h^{-1}$ to 20 $h^{-1}$. In some aspects, LHSV is at least 5 $h^{-1}$, or at least 10 $h^{-1}$, or at least 15 $h^{-1}$. Molecular hydrogen partial pressure during the hydroprocessing is generally in the range of from 0.1 MPa to 8 MPa, or 1 MPa to 7 MPa, or 2 MPa to 6 MPa, or 3 MPa to 5 MPa. In some aspects, the partial pressure of molecular hydrogen is ≤7 MPa, or ≤6 MPa, or ≤5 MPa, or ≤4 MPa, or ≤3 MPa, or ≤2.5 MPa, or ≤2 MPa. The hydroprocessing conditions can include, e.g., one or more of a temperature in the range of 300° C. to 500° C., a pressure in the range of 15 bar (absolute) to 135 bar, or 20 bar to 120 bar, or 20 bar to 100 bar, a space velocity (LHSV) in the range of 0.1 to 5.0, and a molecular hydrogen consumption rate of about 53 standard cubic meters of molecular hydrogen per cubic meter of tar (S $m^3/m^3$) to about 445 S $m^3/m^3$ (300 SCF/B to 2500 SCF/B, where the denominator represents barrels of tar, e.g., barrels of SCT). In one or more aspect, the hydroprocessing conditions include one or more of a temperature in the range of 380° C. to 430° C., a pressure in the range of 21 bar (absolute) to 81 bar (absolute), a space velocity in the range of 0.2 to 1.0, and a hydrogen consumption rate of about 70 S $m^3/m^3$ to about 267 S $m^3/m^3$ (400 SCF/B to 1500 SCF/B). When operated under these conditions using the specified catalyst, hydroconversion conversion is generally ≥25.0% on a weight basis, e.g., ≥50.0%.

In certain aspects, the hydroprocessed effluent comprises: (i) a liquid phase comprising recoverable fluid and hydroprocessed product and (ii) a vapor phase comprising light hydrocarbon gases such as methane, unconverted molecular hydrogen, and heteroatom gases such as hydrogen sulfide. The vapor phase is typically separated and conducted away from the hydroprocessed product as an overhead stream. Typically, the vapor phase comprises about 5.0 wt. % of the total liquid feed to the hydroprocessing reactor.

Recoverable fluid can be separated from the hydroprocessed effluent, e.g., for reuse in the process. The recoverable fluid can have, e.g., substantially the same composition and true boiling point distribution as the utility fluid. In certain aspects, the recoverable fluid comprises ≥70.0 wt. % of aromatics, ≤10.0 wt. % of paraffins, and has a final boiling point ≤750° C., e.g., ≤510° C., such as ≤430° C. After separation of the recoverable fluid, the remainder of the liquid phase comprises a hydroprocessed product having generally desirable blending characteristics compared to those of the hydrocarbon feed.

Initiation of hydroprocessing may also include the use of a primer fluid as described in U.S. Patent Application No. 61/986,316, e.g., until sufficient recoverable fluid is available for recycle and reuse.

In certain aspects, the separations stage is integrated with a control system. The control system typically includes inputs corresponding to $A_f^{small}$, $A_r^{small}$, a pre-determined desired $R_2$, a measured $R_2$, and the amount $A_e^{large}$ of particulates having a size ≥25.0 µm which are extracted from the fluid-feed mixture before hydroprocessing (weight basis, based on the weight of the extract). The controls system further includes means for comparing the measured $R_2$ with the pre-determined desired $R_2$ and means for supplying a correction to the separations system when the measured $R_2$ is ≥the predetermined desired $R_2$. The controls system further includes means for applying the correction to the separations system to increase $A_e^{large}$ while substantially maintaining $A_r^{small}$≥2.0*$A_f^{small}$ until the measured $R_2$ is within an acceptable tolerance of the predetermined desired $R_2$.

The Hydroprocessed Effluent

In certain aspects, at least the following components are separated from the hydroprocessed effluent: (i) an overhead stream, and (ii) a fluid-enriched stream comprising recoverable fluid, and a hydroprocessed product. The hydroprocessed product is typically, but not necessarily, removed from the liquid-phase portion of the hydroprocessed effluent as a bottoms fraction. The overhead typically comprises from 0 wt. % to 20 wt. % of the hydroprocessed effluent. The fluid-enriched stream typically comprises from 20 wt. % to 70 wt. % of the hydroprocessed effluent. The hydroprocessed product typically comprises from 20 wt. % to 70 wt. % of the hydroprocessed effluent.

In other aspects, the overhead stream comprises from 5 wt. % to 10 wt. % of the hydroprocessed effluent. The fluid-enriched stream comprises from 30 to 60 wt. % of the hydroprocessed effluent. The hydroprocessed product comprises from 30 to 70 wt. % of the hydroprocessed effluent.

The overhead stream, the fluid-enriched stream, and hydroprocessed product can be separated by any separation means, e.g., one or more flash drums, splitters, fractionation towers, membranes, absorbents, etc., though the invention is not limited thereto. Fractionation, for example, may be accomplished in one or more distillation towers, or by vapor-liquid separation, for example, by one or more vapor-liquid separators. Describing the separated portions of the hydroprocessed effluent as the overhead stream, the fluid-enriched stream, and hydroprocessed product is not intended to preclude separation in any order or by any particular method of separation. For example, components of the overhead stream and the fluid-enriched stream may be initially separated from the hydroprocessed product as a single stream via a flash drum overhead leaving the desired hydroprocessed product as a flash drum bottoms phase. The overhead and the fluid-enriched stream may later be separated from each other according to any convenient method and the overhead may optionally be carried away for further processing.

The Upgraded Product.

The upgraded product may refer to (i) the raffinate after removal of the utility fluid or (ii) the hydroprocessed product isolated from the hydroprocessed effluent. In particular aspects, the upgraded product has an insolubility number, $I_{product}$, less than that of the hydrocarbon feed. In particular aspects, the insolubility number, $I_{product}$, of the upgraded product may be ≥about 20.0, e.g., ≥about 30, ≥about 40, ≥about 50.0, ≥about 60.0, ≥about 70.0, ≥about 80.0, ≥about 90.0, ≥about 100.0, ≥about 110.0, ≥about 120.0, ≥about 130.0, ≥about 140.0, ≥about 150.0. Additionally or alternatively, $I_{product}$ may be ≤about 150.0, e.g., ≤about 140.0, ≤about 130.0, ≤about 120.0, ≤about 110.0, ≤about 100.0, ≤about 90.0, ≤about 80.0, ≤about 70.0, ≤about 60.0, ≤about 50.0, ≤about 40.0, or ≤about 30.0. Ranges expressly disclosed include combinations of any of the above-enumerated values; e.g., about 20.0 to about 150.0, about 20.0 to about 140.0, about 20.0 to about 130.0, about 20.0 to about 120.0, about 20.0 to about 110.0, about 20.0 to about 100.0, about 20.0 to about 90.0, about 20.0 to about 80.0, about 20.0 to about 70.0, about 20.0 to about 60.0, about 20.0 to about 50.0, about 20.0 to about 40.0, about 20.0 to about 30.0, etc.

The ratio of the insolubility number of the upgraded product, $I_{product}$, to the initial insolubility number of the hydrocarbon feed, $I_{feed}$, may be ≤0.90, e.g., ≤about 0.85, ≤about 0.80, ≤about 0.75, ≤about 0.70, ≤about 0.65, ≤about 0.60, ≤about 0.55, ≤about 0.50, ≤about 0.40, ≤about 0.30, ≤about 0.20, ≤about 0.10. Additionally or alternatively, the insolubility number of the upgraded product, $I_{product}$, may be ≥about 0.10, e.g., ≥about 0.20, ≥about 0.30, ≥about 0.40, ≥about 0.50, ≥about 0.55, ≥about 0.60, ≥about 0.65, ≥about 0.70, ≥about 0.75, ≥about 0.80, or ≥about 0.85. Ranges expressly disclosed include combinations of any of the above-enumerated values; e.g., about 0.10 to 0.90, about 0.20 to 0.90, about 0.30 to 0.90, about 0.40 to 0.90, about 0.50 to 0.90, about 0.55 to 0.90, about 0.60 to 0.90, about 0.65 to 0.90, about 0.70 to 0.90, about 0.75 to 0.90, about 0.80 to 0.90, about 0.85 to 0.90, etc.

Blending with Other Hydrocarbons

The upgraded product or a portion thereof may be blended with a second hydrocarbon, e.g., a heavy hydrocarbon such as one or more fuel oils. In particular aspects, the fuel oil and upgraded product are selected such that the difference between the solubility blending number of the fuel oil-blend-stock, $S_R$), and the insolubility number of the upgraded product, $I_{product}$, is ≥about 5.0 e.g., ≥about 10.0, about ≥20.0, or ≥about 30.0 or more. Additionally or alternatively, the difference may be ≤about 30.0, e.g., ≤about 20.0, or ≤about 10.0. Ranges expressly disclosed include combinations of any of the above-enumerated values; e.g., about 5.0 to about 30.0, about 10.0 to about 30.0, about 20.0 to about 30.0, etc. In particular aspects, the fuel oil blend stock has a solubility blend number, $S_{FO}$, of ≥about 50.0, e.g., ≥about 60.0, ≥about 75.0, ≥about 85.0, ≥about 90.0, ≥about 95.0, or ≥about 100.0. Additionally or alternatively, $S_{FO}$ may be ≤about 100.0, e.g., ≤about 95.0, ≤about 90.0, ≤about 85.0, ≤about 75.0, or ≤about 60.0. Expressly disclosed ranges of $S_{FO}$ include combinations of any of the above-enumerated values; e.g., about 50.0 to about 100.0, about 60.0 to about 100.0, about 75.0 to about 100.0, about 85.0 to about 100.0, about 90.0 to about 100.0, about 95.0 to 100.0, etc. Non-limiting examples of second hydrocarbons suitable for blending with the raffinate (with or without the utility fluid) include one or more of bunker fuel, burner oil, heavy fuel oil (e.g., No. 5 or No. 6 fuel oil), high-sulfur fuel oil, low-sulfur fuel oil, regular-sulfur fuel oil (RSFO), and the like. Optionally, trim molecules may be separated, for example, in a fractionator, from bottoms or overhead or both and added to the utility fluid as desired. Optionally, trim molecules may be separated, for example, in a fractionator, from bottoms or overhead or both and added to the fluid as desired. Blends of the second hydrocarbon and upgraded product may be further processed in any manner.

Features of aspects of the inventions will now be described with reference to one or more of the Figures.

FIG. 1 schematically illustrates a method 100 according to aspects of the invention. In method 100, hydrocarbon feed 102 is combined with utility fluid stream 104 to form the fluid-feed mixture 106. Fluid-feed mixture 106 is directed to separation system 108 configured to selectively remove particulates from the fluid-feed mixture, as described above, to produce an extract 110 and a raffinate 112. Raffinate 112 may be optionally provided via conduit 114 to recovery unit 116 for separation of the utility fluid from the upgraded hydrocarbon product therein, which exits the recovery unit 116 through line 118. Utility fluid exits the recovery unit 116 and may optionally be recycled through line 120 for reuse in the process. Upgraded product may be used or combined with or blended with a second hydrocarbon as described herein.

Figure 2:
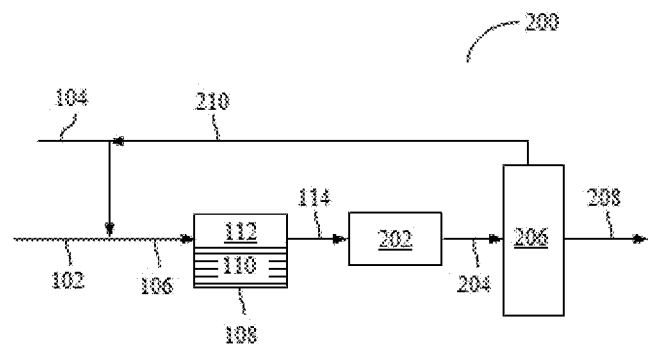
FIG. 2 illustrates another method according to an aspect of the invention.

With continuing reference to FIG. 1, FIG. 2 schematically illustrates a method 200 according to an aspect of the invention. In method 200, raffinate 112 is provided via conduit 114 to a hydroprocessing unit 202 where the raffinate 112, including utility fluid therein, is subjected to hydroprocessing conditions to produce hydroprocessed effluent stream 204. Hydroprocessed effluent stream 204 may optionally be provided to a second separation unit 206. The recovered utility fluid exits the second separation unit 206 via line 210 while the remaining portion containing the hydroprocessed product exits through line 208.

Figure 3:
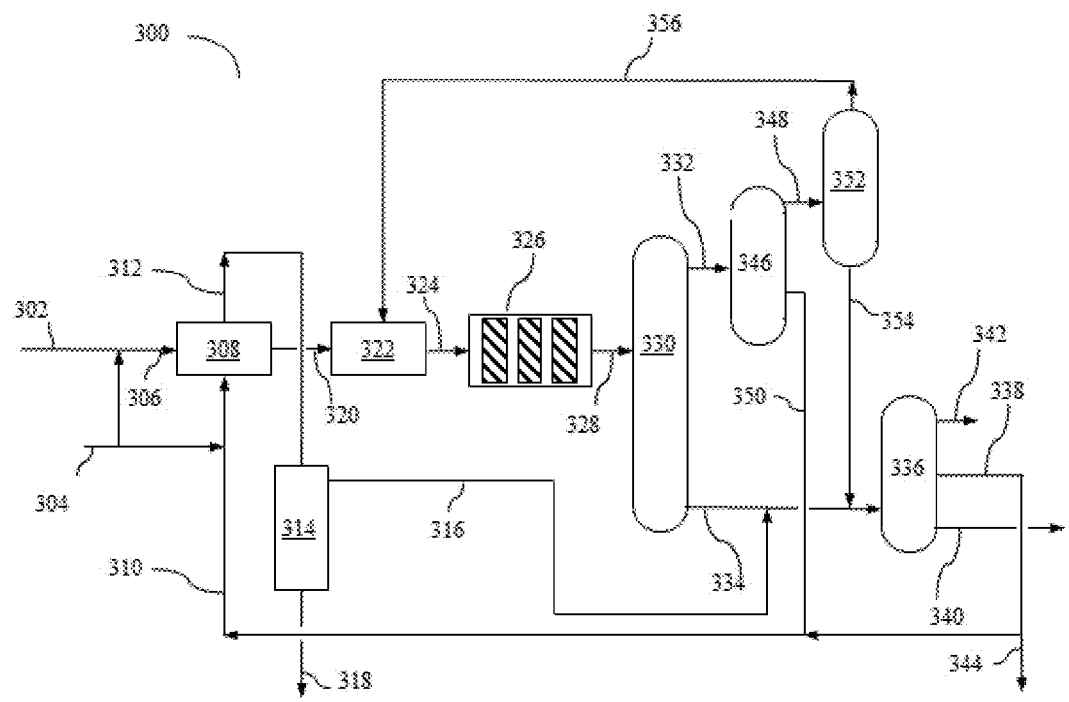
FIG. 3 illustrates yet another method according to an aspect of the invention.

FIG. 3 schematically illustrates a method 300 according to an aspect of the invention. In method 300, hydrocarbon feed 302 is combined with utility fluid stream 304 to form the fluid-feed mixture 306. Fluid-feed mixture 306 is directed to a first separation stage 308 which contains at least one filtration system, the filtration system comprising one or more filters. Stage 308 contains at least one backwashing filtration system capable of removing the extract with backwash stream 310, which may include any suitable liquid, e.g., a portion of utility fluid stream 304 as shown. Backwash stream 310 is configured to enter the filtration system of stage 308 to continuously or intermittently wash the extract from the filter mechanism (not shown) to form solids-enriched stream 312. The solids-enriched stream 312 is conducted to a third separation stage 314, which includes at least one solids separation unit which may be any configuration suitable for separating from the solids-enriched stream 312 a liquid phase that exits via line 316. The separated solids can be conducted away as one component of a solid phase that exits the stage 314, continuously or intermittently, via line 318.

The raffinate exits stage 308 via conduit 320 and is provided to preheater 322 operating at a pressure of about 1000 psi (67 bar (g)) to 1500 psi (100 bar (g)) and a temperature of 700 to 900° F. (371 to 482° C.). The preheated particulate-depleted stream is provided via conduit 324 to hydroprocessing unit 326 where the preheated raffinate along with the utility fluid therein is subjected to hydroprocessing conditions to produce hydroprocessed effluent stream 328. Hydroprocessed effluent stream 328 may be provided to fourth separation stage 330, which may include any separation means suitable for separating the effluent stream 328 into first fluid-enriched stream 332 and a crude hydroprocessed product stream 334. First fluid-enriched stream generally comprises components of the effluent stream having boiling points ≤about 800° F. (427° C.) while crude hydroprocessed product stream 334 generally comprises components boiling in the range of about 400° F. (205° C.) to about 1300° F. (705° C.). In particular aspects, stage 330 includes at least one a high temperature separator operating at a pressure of about 500 to 1500 psig (33 bar (g) to 100 bar (g)), particularly about 1000 psig (67 bar (g)) to about 1500 psi (100 bar (g)) and a temperature of 750° F. (400° C.) to about 800° F. (427° C.). Hydroprocessed product stream 334 may optionally be combined with liquid phase that exits the solid separation unit 314 via line 316 before entering fifth separation stage 336. Stage 336 may include separation means suitable for separating from the hydroprocessed product stream 334, and optional liquid portion in line 316, a second fluid-enriched stream 338 and a product stream 340. Typically although not necessarily, stage 336 separates an overhead stream 342 from stream 334 and optional stream 316. Second fluid-enriched stream 338 may be recycled to backwash stream 310 for reuse or optionally it may be removed from the process via conduit 344. Product stream 340 is removed from the process and optionally used as a fuel oil or provided or used as a component for blending with a second hydrocarbon, e.g., a heavy hydrocarbon such as fuel oil, particularly heavy fuel oil. Optional overhead stream 342 generally comprises $H_2$ and light hydrocarbons, e.g., $C_1$-$C_6$ hydrocarbons. In particular aspects, the fifth separation stage includes at least one a fractionator operating to provide an overhead stream 342 exiting the unit at about 120° F. (49° C.) and a pressure of 35 psi and comprising about 40 vol % $H_2$, about 16 vol. % $CH_4$, about 7 vol. % $H_2S_{FO}$, and about 35 vol. % $C_2$-$C_6$ hydrocarbon.

First fluid-enriched stream 332 exiting first separation unit may optionally be provided to a third separation unit 346, e.g., a medium temperature separator, configured to receive the first fluid-enriched stream 332. Sixth separation stage 346 is operated to separate from the first fluid-enriched stream a second overhead stream 348 and a third-separator bottoms fraction 350. Stage 346 can be operated at a pressure of about 500 psig (33 bar (g)) to 1500 psig (100 bar (g)), particularly about 1000 psig (67 bar (g)) to about 1500 psig (100 bar (g)) and a temperature of 300° F. (150° C.) to about 500° F. (260° C.), to provide a second overhead stream 348 comprising components boiling below about 300° F. (150° C.) and a third-separator bottoms fraction 350 comprising components boiling in the range of about 300° F. (150° C.) to about 800° F. (427° C.). Optionally, third-separator bottoms fraction may be combined with backwash stream 310 for washing the retentate retained by stage 308.

The second overhead stream can be provided to an optional condenser (not shown) before entering fourth separation unit 352. Seventh separation stage 352 may include any separation means, e.g., a low temperature separator, suitable to separate from the second overhead stream, configured to receive the second overhead stream and to separate from the second overhead stream into a hydrogen-enriched stream 356 (e.g., comprising $H_2$ and $C_{4-}$ compounds) and a fourth-separator bottoms stream 354. Optionally, the hydrogen-enriched stream may be upgraded, and recycled to preheater 322 and/or hydroprocessing unit 326. Additionally or alternatively, the fourth-separator bottoms stream may be combined with hydroprocessed product stream 334 and provided to fifth separation unit 336.

Figure 4:
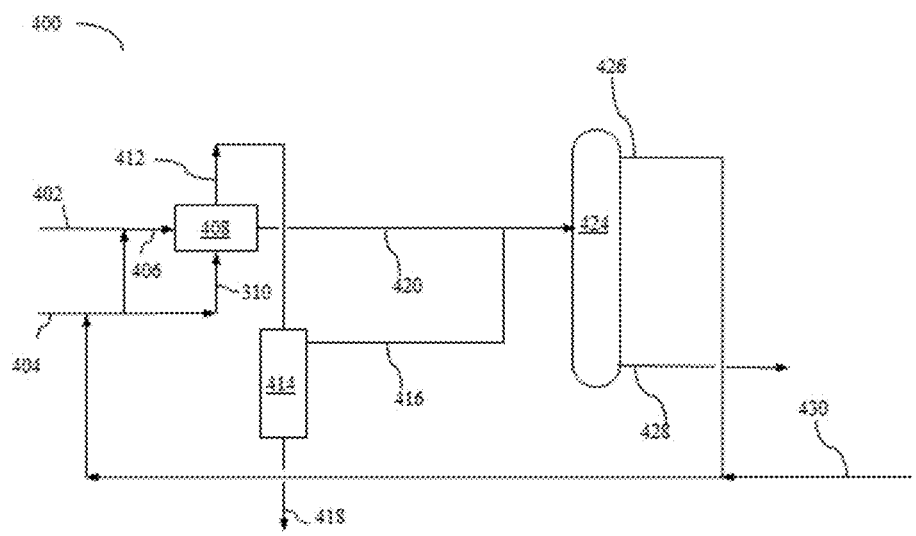
FIG. 4 illustrates still another method according to an aspect of the invention.

FIG. 4 schematically illustrates a method 400 for upgrading a hydrocarbon feed without hydroprocessing according to aspects of the invention. In method 400, hydrocarbon feed 402 is combined with utility fluid stream 404 to form the fluid-feed mixture 406. Fluid-feed mixture 406 is directed to a filtration system 408. Filtration system 408 is a backwashing filtration system that is backwashed with backwash stream 310, which may include any suitable liquid, e.g., a portion of utility fluid stream 404 as depicted. Backwash stream 310 is configured to enter filtration system 408 to continuously or intermittently wash the extract from the filter mechanism (not shown) to form solids-enriched stream 412. The solids-enriched stream 412 is conducted to solids separation unit 414, which may be any configuration suitable for separating from the solids-enriched stream 412 a liquid phase that exits via line 416 and a solid phase that exit the solids separation unit 414, continuously or intermittently, via line 418.

The raffinate exits the filtration system 408 via conduit 420 and combined with the liquid phase in conduit 416. The combined stream 422, (i.e., the raffinate and liquid phase) is provided to a separation unit 424. Separation unit 424 may be any separation unit suitable for separating from the combined stream 422 a utility-fluid enriched stream 426 and an upgraded hydrocarbon product stream 428 having one or more of the properties described herein for the product, e.g., $I_{product}$, $I_{product}$:$I_{feed}$ ratio, concentration of particles having a size ≤20.0 µm, etc. and may be used as upgrade feed for subsequent processes or combined with a second hydrocarbon as described herein. Fluid-enriched stream 426 may, along with optional make-up utility fluid stream 430, be recycled for reuse by combination with utility fluid stream 404.

ADDITIONAL ASPECTS

Aspect 1

A process for upgrading a hydrocarbon feed, comprising: (a) providing a fluid-feed mixture comprising a hydrocarbon feed and a utility fluid, the fluid-feed mixture having first and second particulates, the first particulates having a size ≥25 μm and being present in the fluid-feed mixture in an amount $A_f^{large}$, and the second particulates having a size in the range of 1.0 to 20.0 μm and being present in the fluid-feed mixture in an amount $A_f^{small}$; (b) selectively extracting from the fluid-feed mixture at least a portion of the first particulates to produce a raffinate and an extract; and optionally (c) hydroprocessing at least a portion of the raffinate to provide a hydroprocessed effluent; wherein the raffinate comprises ≥50 wt. % of the fluid-feed mixture's second particulates, and wherein the extract comprises ≥50% wt. % of the fluid-feed mixture's first particulates. It is observed that for certain heavy hydrocarbon feeds, e.g., those comprising SCT, the raffinate is an upgraded product (has improved blending characteristics such as an improved S and/or improved I over that of the hydrocarbon feed) even in aspects which do not include hydroprocessing the raffinate. Even though raffinate hydroprocessing is optional for such hydrocarbon feeds, hydroprocessing at least a portion of the raffinate is observed to further improve the raffinate's blending characteristics over those of the hydrocarbon feed.

Aspect 2

Aspect 1, wherein said second particulates are present in the raffinate in an amount $A_r^{small}$, wherein the ratio of $A_r^{small}:A_f^{small}$ is 2.0 to 50.0.

Aspect 3

Aspect 2 or 3, wherein the utility fluid has a solubility blending number, $S_{fluid}$, of ≥90, preferably 90.0 to about 200.0, about 100.0 to about 200.0, about 110.0 to about 200.0, about 120.0 to about 200.0, about 150.0 to about 200.0, about 175.0 to about 200.0.

Aspect 4

Any of Aspects 1 to 3, wherein the utility fluid has a kinetic viscosity of about 0.1 to about 5.0 cPoise, about 0.5 to about 5.0 cPoise, about 1.0 to about 5.0 cPoise, about 2.5 to about 5.0 cPoise, or about 4.0 to about 5.0 cPoise.

Aspect 5

Any of Aspects 1 to 4, wherein said selectively extracting step comprises passing the fluid-feed mixture through a backwashing filtration system capable of providing the extract and the raffinate.

Aspect 6

Any of Aspects 1 to 5, wherein said selectively extracting step includes removing ≥50 wt. %, e.g., ≥75 wt. %, ≥80 wt. %, ≥90 wt. %, ≥95 wt. %, ≥97.5 wt. %, or ≥99 wt. %, of particles having a size 25 to 100 μm from the fluid-feed mixture to produce the raffinate.

Aspect 7

Any of Aspects 1 to 6, wherein the fluid-feed mixture has a kinetic viscosity of about 0.5 to about 10.0 cPoise, about 1.0 to about 10.0 cPoise, about 2.5 to about 10.0 cPoise, about 5.0 to about 10.0 cPoise, or about 7.5 to about 10.0 cPoise at 50° C.

Aspect 8

Any aspect encompassed by Aspect 7, wherein said selectively extracting step comprises providing the fluid-feed mixture to at least one sedimentation unit.

Aspect 9

Any of Aspects 1 to 8, wherein the fluid-feed mixture comprises 5.0 to about 95.0 wt. % utility fluid and 5.0 to 95.0 wt. % hydrocarbon feed.

Aspect 10

Any of Aspects 1 to 9, further comprising providing the extract to at least one solids separation unit, e.g., one or more centrifuge, sedimentation unit, or cyclonic separator (e.g., hydrocyclone) for removing particulates, e.g., solids, from the extract.

Aspect 11

Any of Aspects 1 to 10, wherein the raffinate is produced in the separation system in an amount in the range of from about $7.0 \times 10^4$ to about $10.0 \times 10^4$ kg/hour, about $7.5 \times 10^4$ to about $10.0 \times 10^4$ kg/hour, about $8.0 \times 10^4$ to about $10.0 \times 10^4$ kg/hour, about $8.5 \times 10^4$ to about $10.0 \times 10^4$ kg/hour, about $9.0 \times 10^4$ to about $10.0 \times 10^4$ kg/hour, or about $9.5 \times 10^4$ to about $10.0 \times 10^4$ kg/hour.

Aspect 12

A process for upgrading a hydrocarbon feed, the process comprising: (a) providing a fluid-feed mixture comprising a hydrocarbon feed and a utility fluid; the fluid-feed mixture having first and second particulates, the first particulates having a size ≥25 μm and being present in the fluid-feed mixture in an amount $A_f^{large}$, and the second particulates having a size in the range of 1.0 to 20.0 μm and being present in the fluid-feed mixture in an amount $A_f^{small}$; (b) passing the fluid-feed mixture through a backwashing filtration system to provide a raffinate and an extract, the extract comprising extracted first particulates; and (c) hydroprocessing at least a portion of the raffinate to provide a hydroprocessed effluent; wherein the raffinate comprises ≥50 wt. % of the fluid-feed mixture's second particulates, and wherein the extract comprises ≥50% wt. % of the fluid-feed mixture's first particulates.

Aspect 13

Aspect 12, wherein said second particulates are present in the raffinate in an amount $A_r^{small}$, wherein the weight ratio of $A_r^{small}:A_f^{small}$ is 2.0 to 50.0.

Aspect 14

Aspect 12 or 13, wherein the utility fluid has a solubility blending number, $S_{fluid}$, of ≥90, preferably 90.0 to about 200.0, about 100.0 to about 200.0, about 110.0 to about 200.0, about 120.0 to about 200.0, about 150.0 to about 200.0, or about 175.0 to about 200.0.

Aspect 15

Any of Aspects 12 to 14, wherein the utility fluid has a kinetic viscosity of about 0.1 to about 5.0 cPoise, about 0.5 to about 5.0 cPoise, about 1.0 to about 5.0 cPoise, about 2.5 to about 5.0 cPoise, or about 4.0 to about 5.0 cPoise at 50° C.

Aspect 16

Any of Aspects 12 to 15, wherein said selectively extracting step includes removing ≥50 wt. %, e.g., ≥75 wt. %, ≥80 wt. %, ≥90 wt. %, ≥95 wt. %, ≥97.5 wt. %, or ≥99 wt. %, of particles having a size 25 to 100 μm from the fluid-feed mixture to produce the raffinate.

Aspect 17

Any of Aspects 12 to 16, wherein the fluid-feed mixture has a kinetic viscosity about 0.5 to about 10.0 cPoise, about 1.0 to about 10.0 cPoise, about 2.5 to about 10.0 cPoise, about 5.0 to about 10.0 cPoise, or about 7.5 to about 10.0 cPoise at 50° C.

Aspect 18

Any of Aspects 12 to 17, wherein the fluid-feed mixture comprises 5.0 to about 95.0 wt. % utility fluid, and 5.0 to 95.0 wt. % hydrocarbon feed.

Aspect 19

Any of Aspects 12 to 18, further comprising providing the extract to at least one solids separation unit, e.g., one or more centrifuge, sedimentation unit, or cyclonic separator (e.g., hydrocyclone).

Aspect 20

Any of Aspects 12 to 19, wherein the separation system produces raffinate in an amount in the range of about $7.0 \times 10^4$ to about $10.0 \times 10^4$ kg/hour, about $7.5 \times 10^4$ to about $10.0 \times 10^4$ kg/hour, about $8.0 \times 10^4$ to about $10.0 \times 10^4$ kg/hour, about $8.5 \times 10^4$ to about $10.0 \times 10^4$ kg/hour, about $9.0 \times 10^4$ to about $10.0 \times 10^4$ kg/hour, or about $9.5 \times 10^4$ to about $10.0 \times 10^4$ kg/hour.

Aspect 21

An apparatus for upgrading a hydrocarbon feed, comprising: (a) a fluid-feed supply for supplying a fluid-feed mixture, the fluid-feed mixture comprising a hydrocarbon feed and a utility fluid, the fluid-feed mixture having first and second particulates, the first particulates having a size ≥25 μm and being present in the fluid-feed mixture in an amount $A_f^{large}$, and the second particulates having a size in the range of 1.0 to 20.0 μm and being present in the fluid-feed mixture in an amount $A_f^{small}$; (b) a separation system capable of selectively extracting from the fluid-feed mixture at least a portion of the first particulates to produce a raffinate and an extract; and (c) a hydroprocessing unit configured to receive the raffinate and to provide a hydroprocessed effluent; wherein the raffinate comprises ≥50 wt. % of the fluid-feed mixture's second particulates, and wherein the extract comprises ≥50% wt. % of the fluid-feed mixture's first particulates.

Aspect 22

Aspect 21, wherein the separation system comprises at least one backwashing filtration system for providing the extract and the raffinate.

Aspect 23

Any of Aspects 21 or 22, wherein the separation system comprises at least one sedimentation unit for providing the extract and the raffinate.

Aspect 24

Any of Aspects 21 to 23, further comprising at least one solids separation unit, e.g., one or more centrifuge, sedimentation unit, or cyclonic separator (e.g., hydrocyclone), the solids separation unit being configured to receive the extract and to separate a liquid portion therefrom.

Aspect 25

Any of Aspects 21 to 24, further comprising a first separation unit, preferably a high temperature separator, configured to receive the hydroprocessed effluent and to separate the from hydroprocessed effluent a first fluid-enriched stream and a hydroprocessed product stream.

Aspect 26

Any aspect encompassed by Aspect 25, further comprising a second separation unit, preferably a stabilizer, to provide at least an overhead stream, the second separation unit being configured to receive the hydroprocessed product stream and to separate from the hydroprocessed product stream a second fluid-enriched stream and a product stream.

Aspect 27

Any aspect encompassed by Aspect 26, further comprising a third separation unit, preferably a medium temperature separator, the third separation unit being configured to receive the first fluid-enriched stream and to separate from the first fluid-enriched stream a second overhead stream and a third separator bottoms fraction.

Aspect 28

Any aspect encompassed by Aspect 27, further comprising a fourth separation unit, preferably a low temperature separator, the fourth separation unit being configured to receive the second overhead stream and to separate from the second overhear stream a hydrogen-enriched stream and a fourth separator bottoms stream, and optionally providing the hydrogen-enriched stream to the hydroprocessing unit and/or providing the fourth separator bottoms stream to the second separation unit.

EXAMPLES

Example 1

In Example 1, an unfiltered steam cracker tar having an initial insolubility number $I_{feed}$ and comprising about 2.2 wt. % particulate matter is combined with a trimethylbenzene as a utility fluid (50 wt. %:50 wt. %) to form a fluid-feed mixture. A 45.7 cm length of ⅜ inch (0.9525 cm) SS tubing is used as the reactor. The middle 34 cm is held at a near-isothermal temperature of 400° C. during the course of the experiment. The reactor is loaded with 18 cm$^3$ of a commercial NiMo oxide on alumina hydrotreating catalyst (RT-621).

The reactor is sulfided by flowing a 20 wt. % solution of dimethyldisulfide in isopar M through the packed reactor at 0.042 mL/min for 1 hour at 100° C., then for 12 hours at 240° C., and finally for 60 hours at 340° C. The sulfiding procedure is performed while flowing 20 standard cubic centimeters per minute (sccm) H$_2$ at a pressure of 1000 psig (67 bar (g)).

The fluid-feed mixture is fed to the reactor at a weight hourly space velocity (WHSV) of about 1.0 hr$^{-1}$. Additionally, molecular hydrogen is fed to reactor at a rate of 1500 standard cubic feet per barrel (scfb). Reactor pressure is held at 1000 psig (67 bar (g)) and a temperature of 380° C. to 415° C.

The reactor is operated semi-continuously in the following sequence:
(a) A batch fluid-feed mixture is hydroprocessed as specified in the reactor.
(b) A total vapor product "offgas" is separated from the reactor effluent and discarded.
(c) The hydroprocessed effluent (liquid) is collected from each batch. The amount of hydroprocessed effluent is approximately 95.0 wt. % of the total liquid feed to the reactor.
(d) The hydroprocessed effluent from each batch is separated using a rotary evaporator into overhead (5 to 10 wt. %), mid-cut (40 to 50 wt. %), and bottoms (40 to 50 wt. %).
(e) The mid-cut from the previous batch is used as utility fluid for the subsequent batch. Excess mid-cut from each batch is discarded. Cycle 0 denotes the first batch using trimethyl-benzene as primer fluid.

Figure 5:
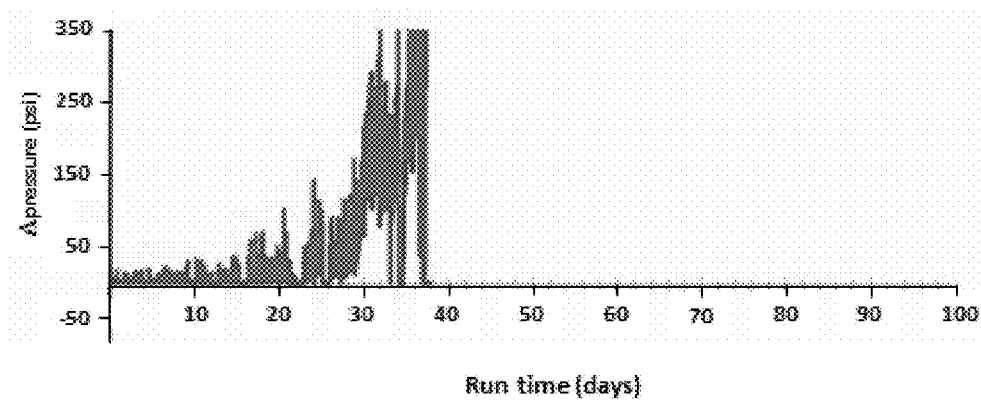
FIG. 5 illustrates the pressure drop of the hydroprocessing unit over time for a raw hydrocarbon feed.

Each batch requires about 5 days to complete. The reactor is operated semi-continuously under substantially the specified conditions for approximately 30 days while monitoring the pressure drop. The pressure drop over the course the hydroprocessing reaction is shown in FIG. 5.

Example 2

Figure 6:
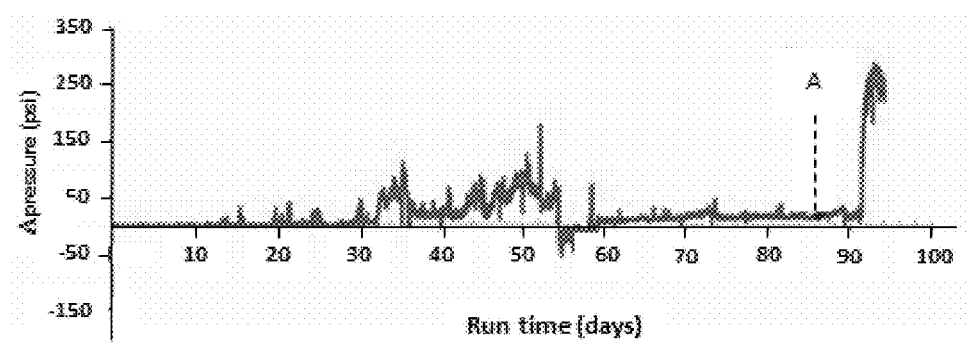
FIG. 6 illustrates the pressure drop of the hydroprocessing unit over time for a hydrocarbon feed treated according to an aspects of the invention.

Example 1 is substantially repeated except that prior to entry into the hydroprocessing reactor, the fluid-feed mixture is filtered through a sieve designed to retain essentially all particles having a size ≥25 μm while letting particles having a smaller size pass through the filter. Due to time constraints the hydroprocessing reaction is stopped at time A by providing a feed comprising 100% A200 utility fluid. As FIG. 6 shows, allowing particles having a size up to 20-25 μm to pass through the filter to the hydroprocessor does not detrimentally affect the pressure drop observed over the course of the reaction at least until the reaction is purposely terminated.

Examples 3 and 4

Figure 7:
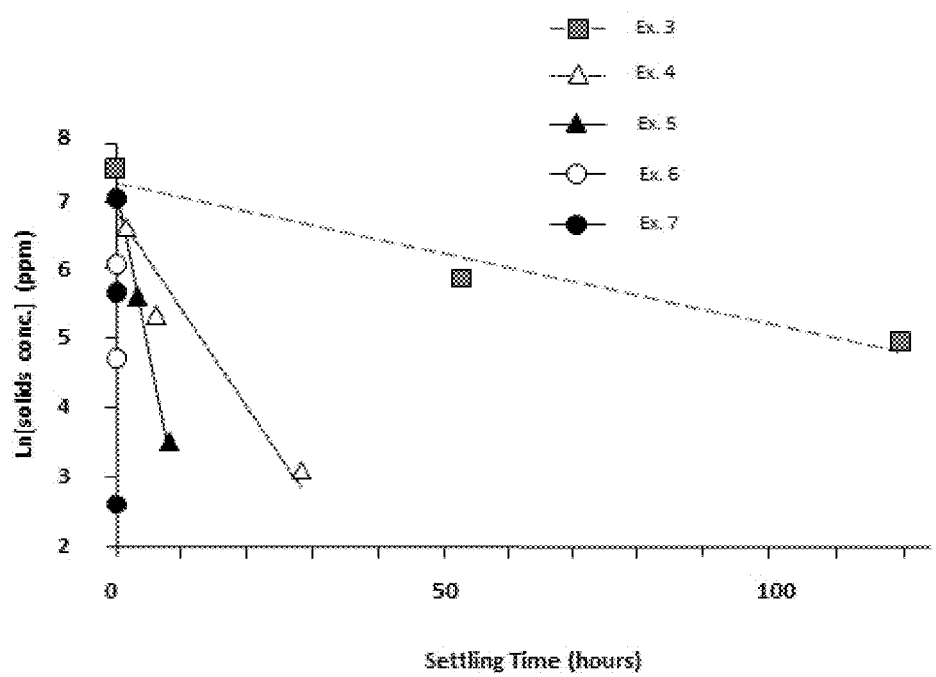
FIG. 7 illustrates the rate of sedimentation for a steam cracker tar and fluid-tar mixtures at different temperatures.

In Example 3, the rate of sedimentation at 90° C. is observed for the steam cracker tar of Example 1. As shown in FIG. 7, the rate of sedimentation is relatively slow. In Example 4, Example 3 is substantially repeated except that the temperature is 115° C. As FIG. 7 shows the sedimentation rate is somewhat faster, but is still relatively slow.

Example 5

Example 3 is substantially repeated, except that the steam cracker tar of Example 1 is combined with utility fluid A200, available form Exxon Mobil Chemical Company (50:50 wt. %) and the sedimentation rate is observed at about 25° C. FIG. 7 shows that even at this lower temperature the sedimentation rate is significantly increased.

Example 6

Example 5 is substantially repeated except that the sedimentation rate is observed at 115° C. The sedimentation rate as shown in FIG. 7 is substantially increased.

Example 7

Example 5 is substantially repeated, except that the steam cracker tar of Example 1 is combined with toluene (50:50 wt. %). The sedimentation rate as shown in FIG. 7 is substantially increased.

Examples 8 and 9

Figure 8:
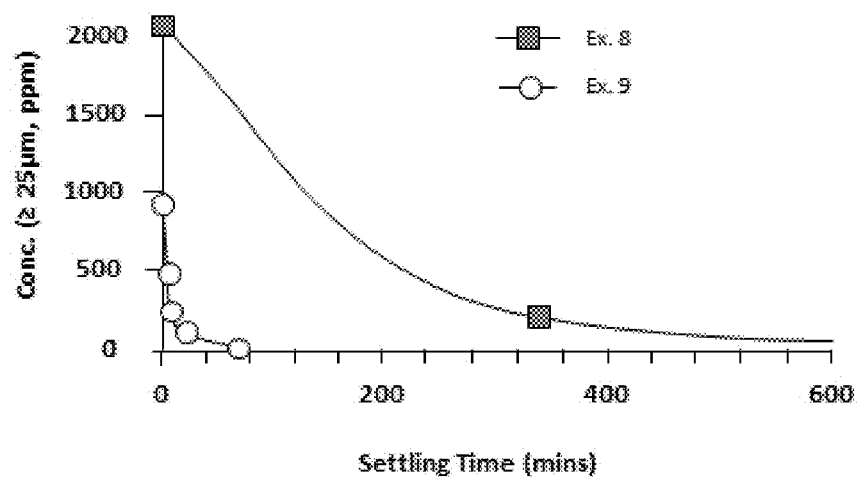
FIG. 8 compares the sedimentation rate of particulate matter having a size ≥25 μm in steam cracker tar and a fluid-tar mixture.

In Example 8, the sedimentation rate of particulate matter having a size ≥25 μm in the steam cracker tar of Example 1 is observed at a temperature of 115° C. In Example 9, Example 8 is substantially reproduced, except that the steam cracker tar is combined with utility fluid A200 (50:50 wt. %). As FIG. 8 shows, the sedimentation rate of the particulate matter having a size ≥25 μm is significantly increased such that after about 80 minutes, essentially all the particulate matter having a size ≥25 μm is settled out of the fluid-feed mixture. Thus, indicating that settling times may be significantly shorted compared to the tar itself. Example 9 also shows that the settling time is also much shorter under the same conditions than required if settling of all particles is measured, as in Example 6.

Examples 10 and 11

Figure 9:
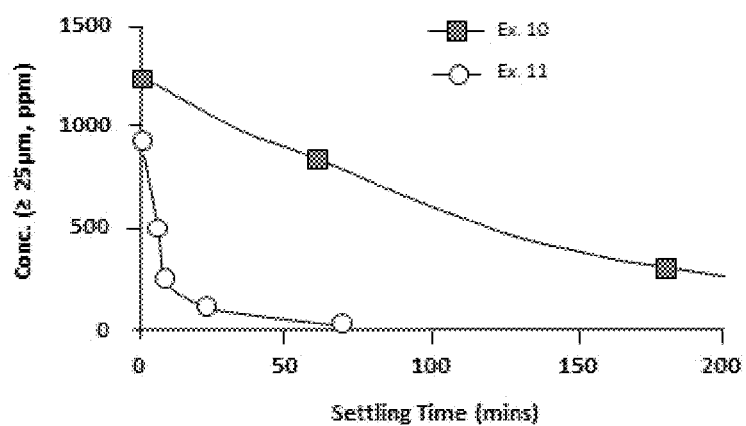
FIG. 9 illustrates the effect of temperature on the sedimentation rate of particulate matter having a size ≥25 μm in steam cracker tar and a fluid-tar mixture.

In Example 10, the sedimentation rate of particulate matter having a size ≥25 μm in the fluid-feed mixture of Example 9 is observed at a temperature of 25° C. Example 11 substantially reproduces Example 9. As FIG. 9 shows, the sedimentation rate of the particulate matter having a size ≥25 μm significantly increases at higher temperature.

All documents described herein are incorporated by reference herein for purposes of all jurisdictions where such practice is allowed, including any priority documents and/or testing procedures to the extent they are not inconsistent with this text, provided however that any priority document not named in the initially filed application or filing documents is NOT incorporated by reference herein. As is apparent from the foregoing general description and the specific aspects, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. An upgrading system for upgrading a hydrocarbon feed, comprising:
   (a) a fluid-feed supply for supplying a fluid-feed mixture comprising a hydrocarbon feed and a utility fluid, the fluid-feed mixture having first and second particulates, the first particulates having a size ≥25 μm, and the second particulates having a size in the range of 1.0 to 20.0 μm;
   (b) a separation system adapted for selectively extracting from the fluid-feed mixture at least a portion of the first particulates to produce a raffinate comprising ≥50 wt. % of the second particulates and an extract comprising ≥50 wt. % of the first particulates;
   (c) a hydroprocessor for hydroprocessing at least a portion of the raffinate wherein the raffinate comprises ≥50 wt. % of the second particulates present in the fluid-feed mixture when supplied to the hydroprocessor; and
   (d) a conduit for transferring the raffinate comprising ≥50 wt. % of the second particulates from the separation system to the hydroprocessor.

2. The upgrading system of claim 1, wherein the separation system comprises a backwashing filtration system for providing the extract and the raffinate.

3. The upgrading system of claim 1, wherein the separation system comprises a sedimentation unit for providing the extract and the raffinate.

4. The upgrading system of claim 1, further comprising a solids separation unit configured to receive the extract and to separate a liquid portion therefrom.

5. The upgrading system of claim 1, further comprising (A) means for withdrawing a hydroprocessed effluent from the hydroprocessor and (B) a first separation unit configured to (i) receive the withdrawn hydroprocessed effluent and (ii) separate from the hydroprocessed effluent a first fluid-enriched stream and a hydroprocessed product stream.

6. The upgrading system of claim 5, further comprising a second separation unit to provide an overhead stream, configured to receive the hydroprocessed product stream and to separate from the hydroprocessed product stream a second fluid-enriched stream and a product stream.

7. The upgrading system of claim 1, wherein the raffinate comprises ≥60 wt. % of the second particulates and the extract comprises ≥75 wt. % of the first particulates.

8. An upgrading system for upgrading a hydrocarbon feed, comprising:
   a conduit configured to direct a fluid-feed mixture into a separation system, the fluid-feed mixture comprising a hydrocarbon feed, a utility fluid, a plurality of first particulates having a size ≥25 μm, and a plurality of second particulates having a size of 1.0 to 20.0 μm, wherein the separation system is configured to selectively separate the first particulates from the fluid-feed mixture by sedimentation, filtration, extraction, centrifugation, or a combination thereof to produce a raffinate comprising ≥50 wt. % of the second particulates present in the fluid-feed mixture and an extract comprising ≥50 wt. % of the first particulates present in the fluid-feed mixture; and
   a conduit configured to direct the raffinate comprising ≥50 wt. % of the second particles present in the fluid-feed mixture into a hydroprocessor, wherein the hydroprocessor is configured to hydroprocess the raffinate comprising ≥50 wt. % of the second particles present in the fluid-feed mixture to produce a hydroprocessed effluent.

9. The upgrading system of claim 8, wherein the separation system comprises a filter.

10. The upgrading system of claim 8, wherein the separation system comprises a backwashing filtration system.

11. The upgrading system of claim 8, wherein the separation system comprises a sedimentation unit.

12. The upgrading system of claim 8, wherein the separation system comprises a cyclone.

13. The upgrading system of claim 8, wherein the raffinate comprises ≥60 wt. % of the second particulates and the extract comprises ≥75 wt. % of the first particulates.

14. An upgrading system for upgrading a hydrocarbon feed, comprising:
   a first conduit, a separation system, a second conduit, and a hydroprocessor, wherein:
      the first conduit is configured to direct a fluid-feed mixture into the separation system, the fluid-feed mixture comprising a hydrocarbon feed, a utility fluid, a plurality of first particulates having a size ≥25 μm, and a plurality of second particulates having a size of 1.0 to 20.0 μm,
      the separation system is configured to selectively extract the first particulates from the fluid-feed mixture by sedimentation, filtration, centrifugation, or a combination thereof to produce a raffinate comprising ≥50 wt. % of the second particulates and ≤50 wt. % of the first particulates present in the fluid-feed mixture and an extract comprising ≤50 wt. % of the second particulates and ≥50 wt. % of the first particulates present in the fluid-feed mixture,
      the second conduit is configured to direct the raffinate comprising ≥50 wt. % of the second particles present in the fluid-feed mixture from the separation system and into the hydroprocessor, and
      the hydroprocessor is configured to hydroprocess the raffinate comprising ≥50 wt. % of the second particles present in the fluid-feed mixture to produce a hydroprocessed effluent.

15. The upgrading system of claim 14, wherein the separation system comprises a filter.

16. The upgrading system of claim 14, wherein the separation system comprises a backwashing filtration system.

17. The upgrading system of claim 14, wherein the separation system comprises a sedimentation unit.

18. The upgrading system of claim 14, wherein the separation system comprises a cyclone.

19. The upgrading system of claim 14, wherein the raffinate comprises ≥60 wt. % of the second particulates and the extract comprises ≥75 wt. % of the first particulates.

20. The upgrading system of claim 14, wherein the raffinate comprises ≥80 wt. % of the second particulates and the extract comprises ≥90 wt. % of the first particulates.

* * * * *